Oct. 4, 1966   C. J. PANKOW   3,276,092
APPARATUS FOR CASTING HOLLOW REINFORCED AND
PRE-STRESSED MEMBERS
Filed July 30, 1962   9 Sheets-Sheet 5
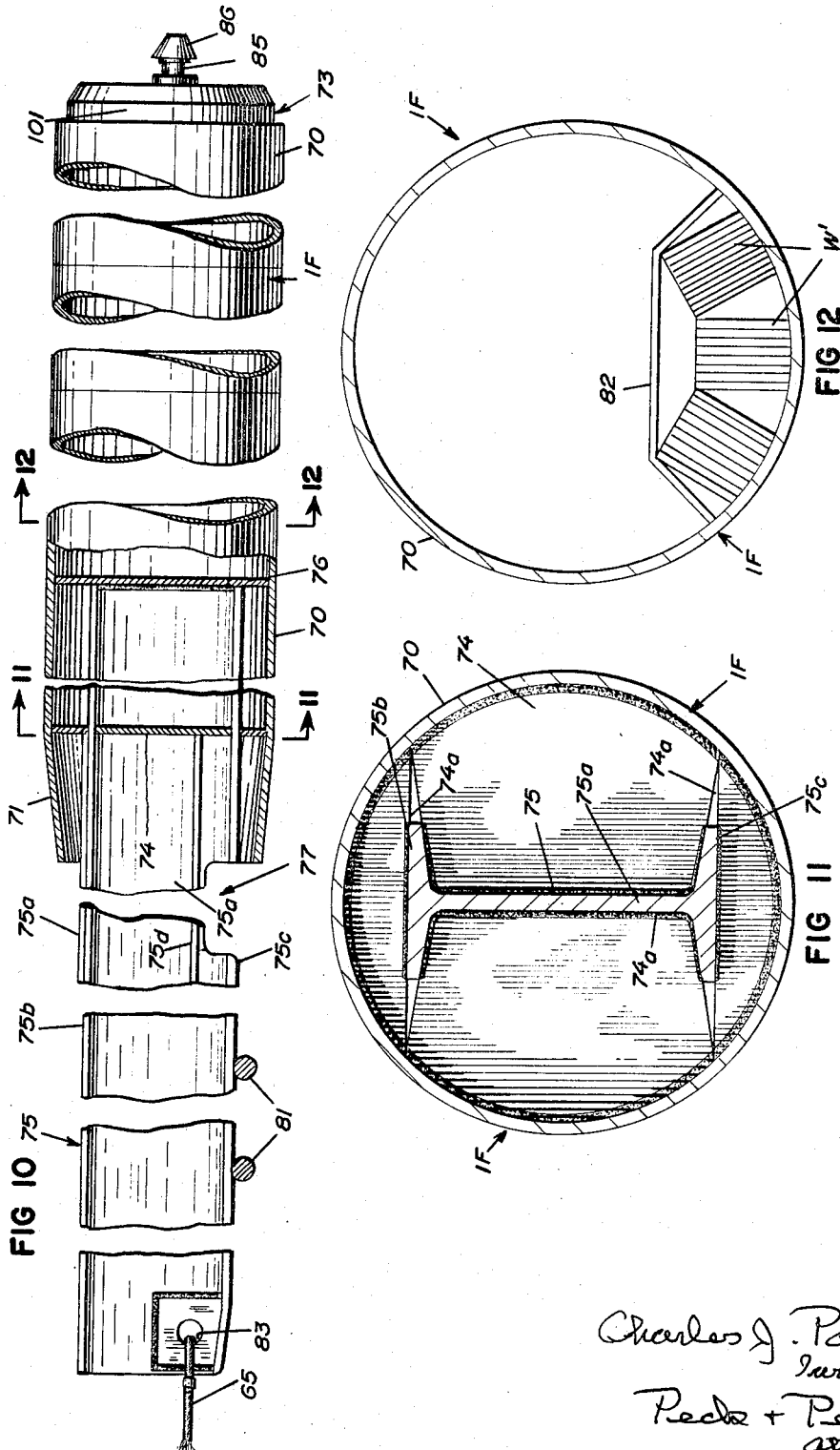

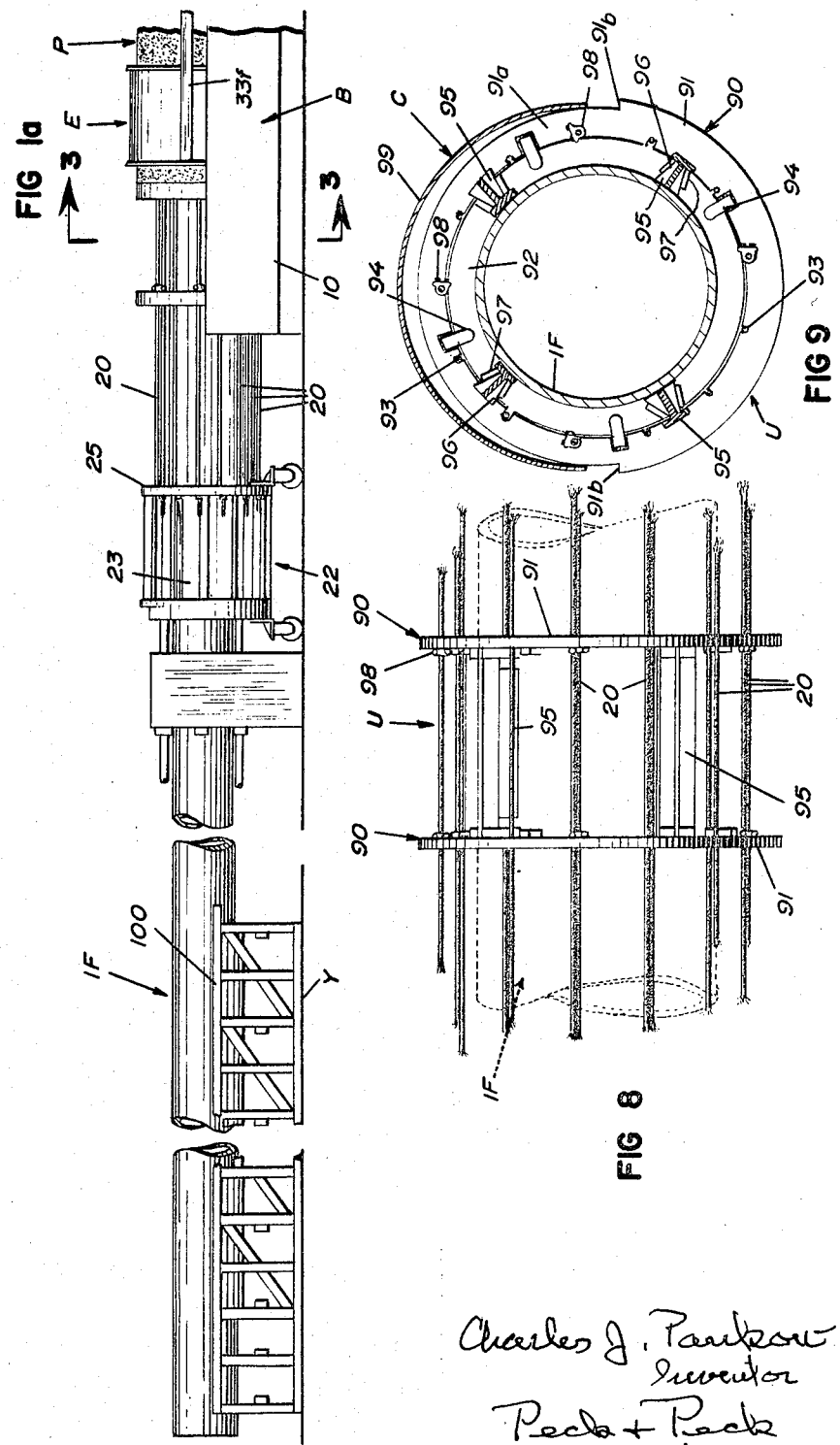

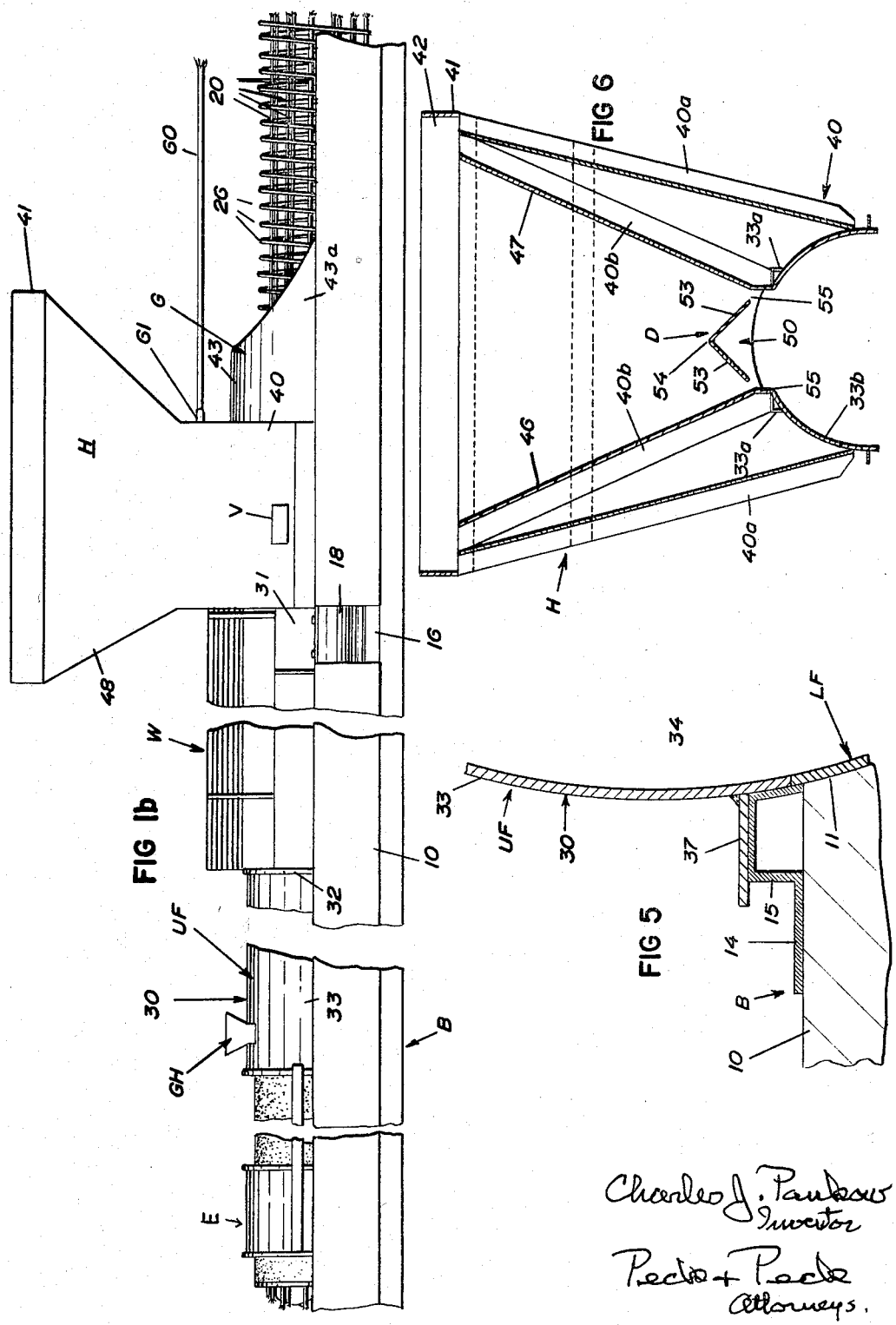

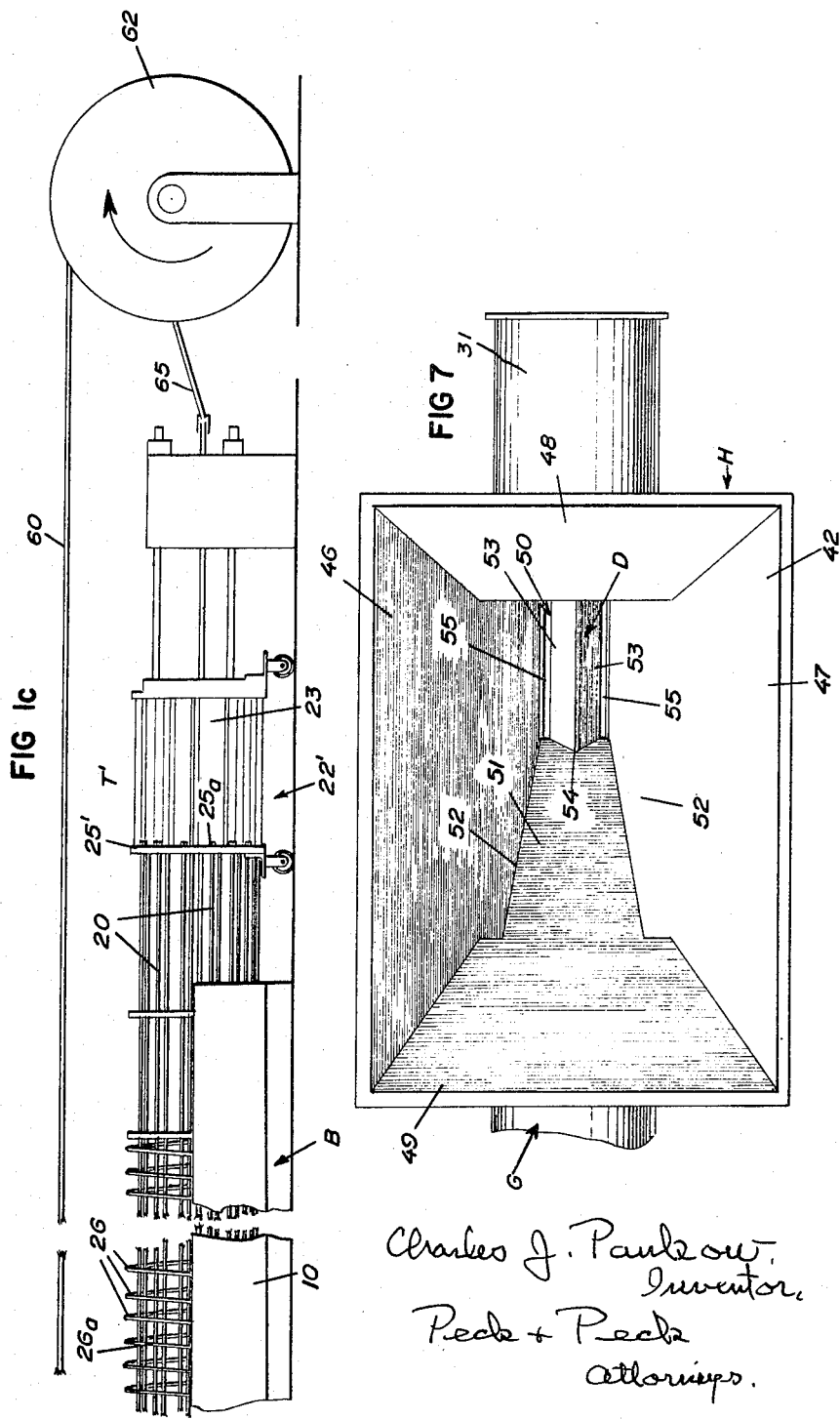

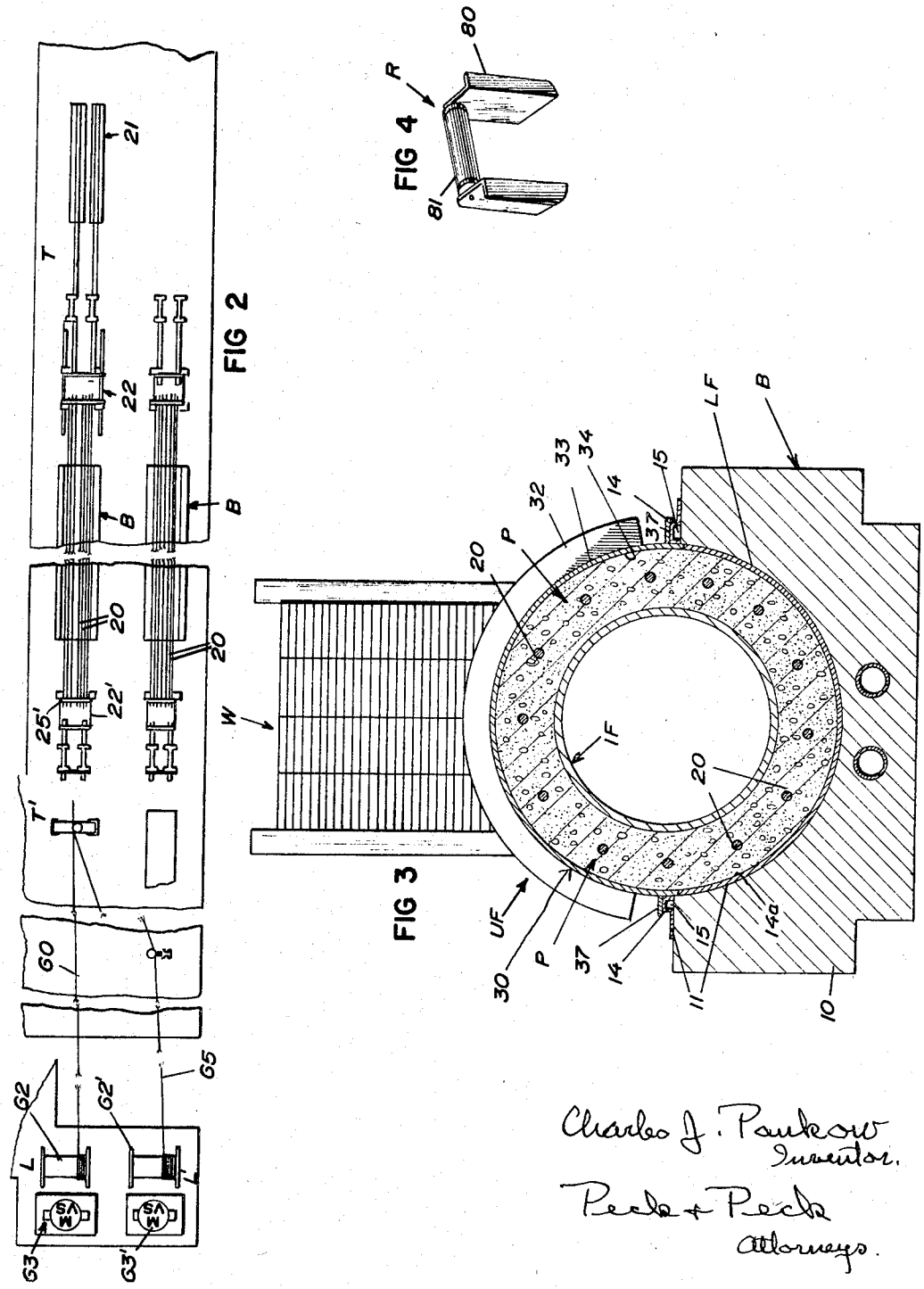

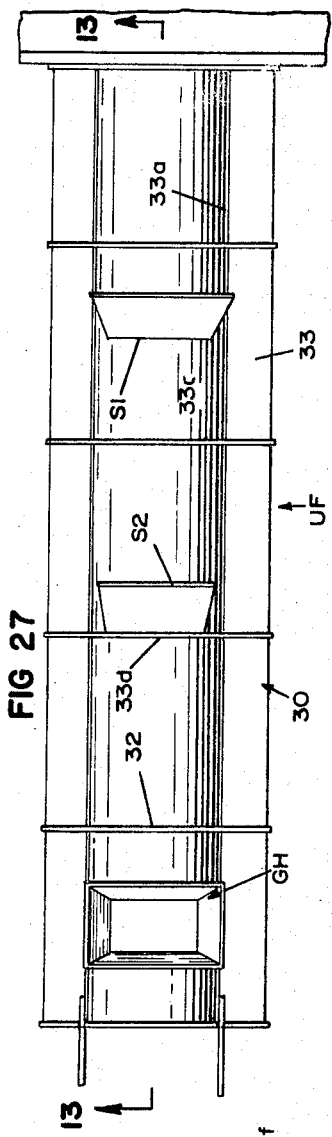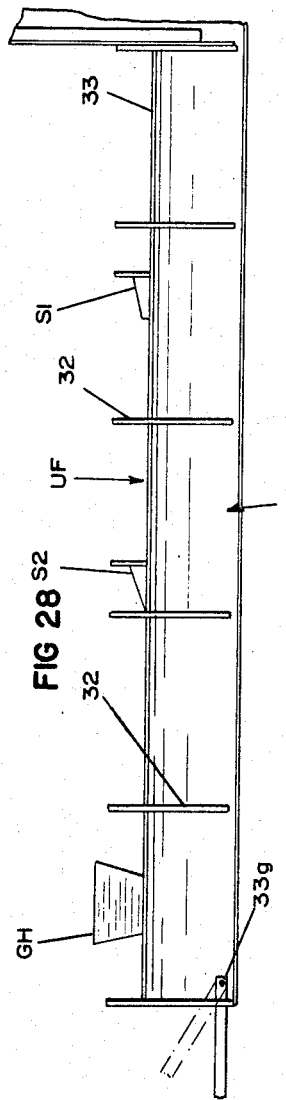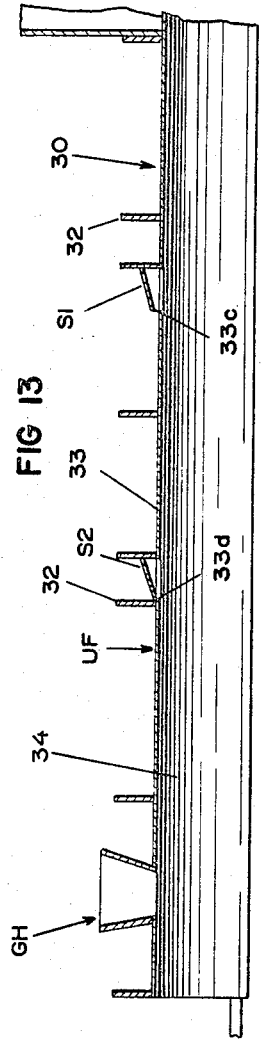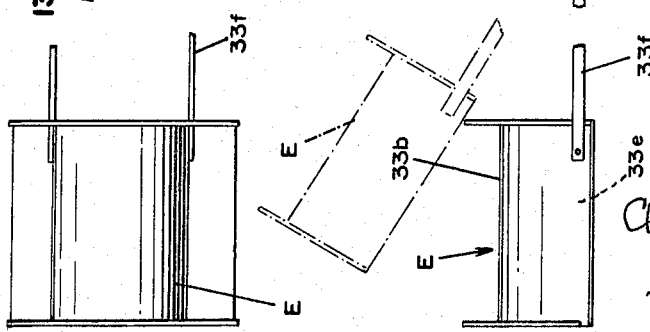

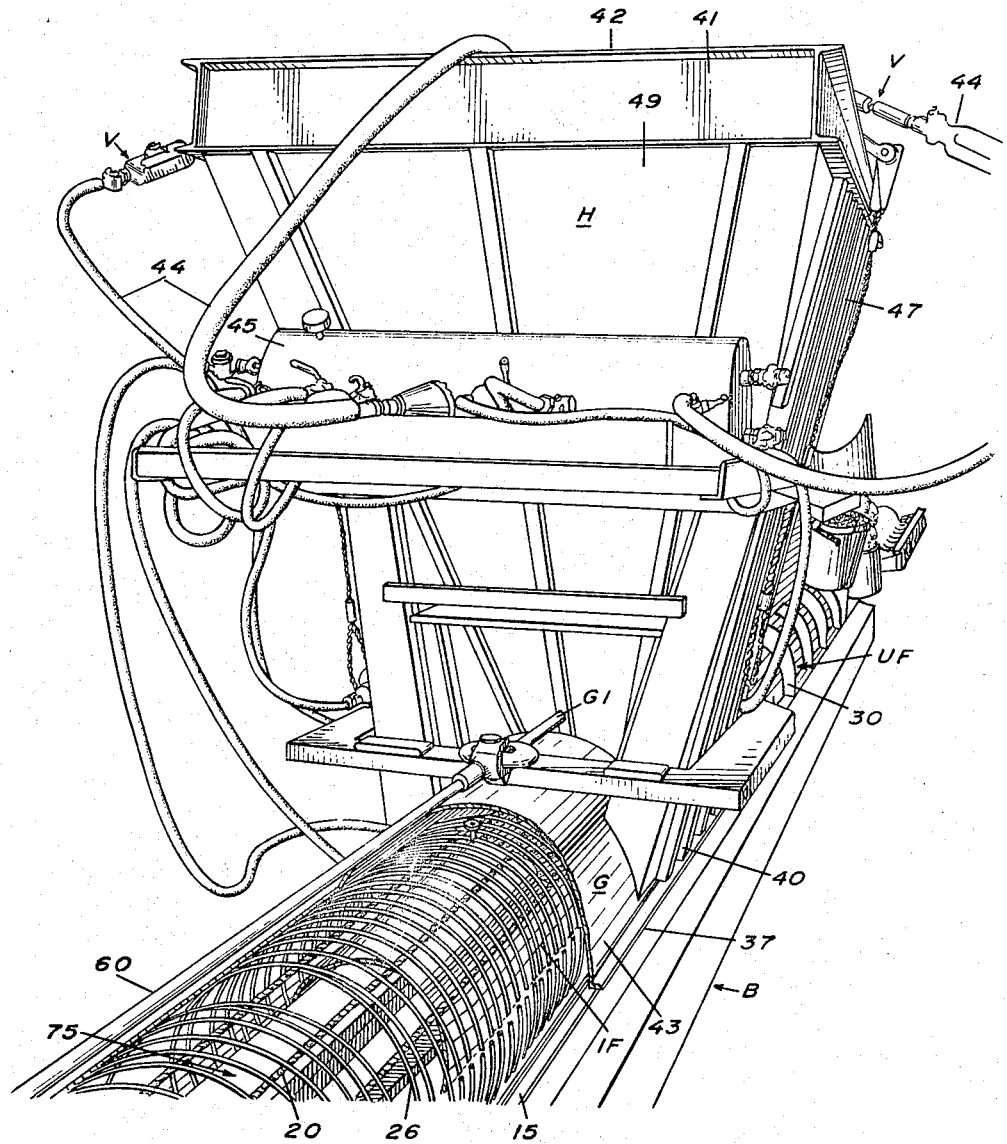

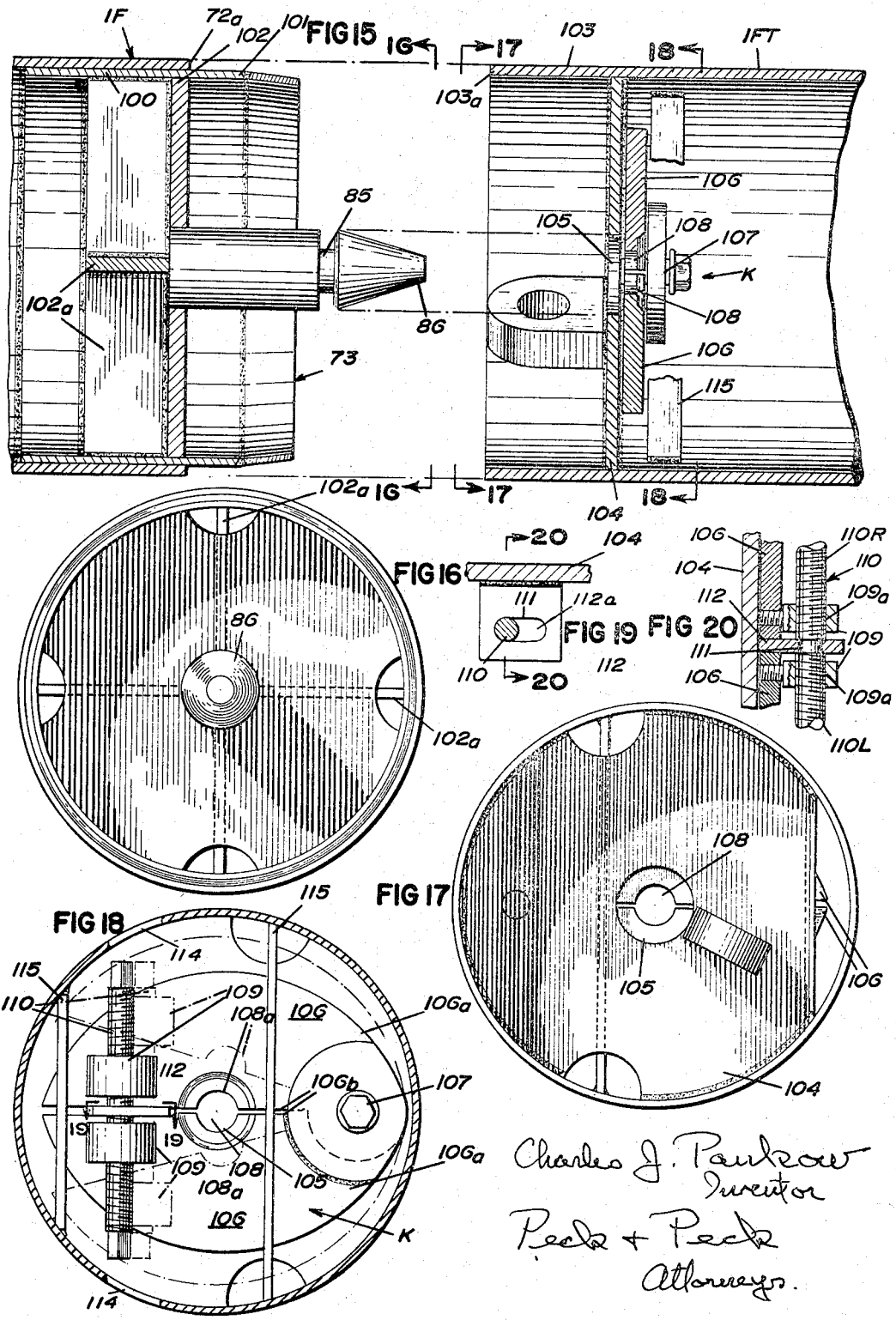

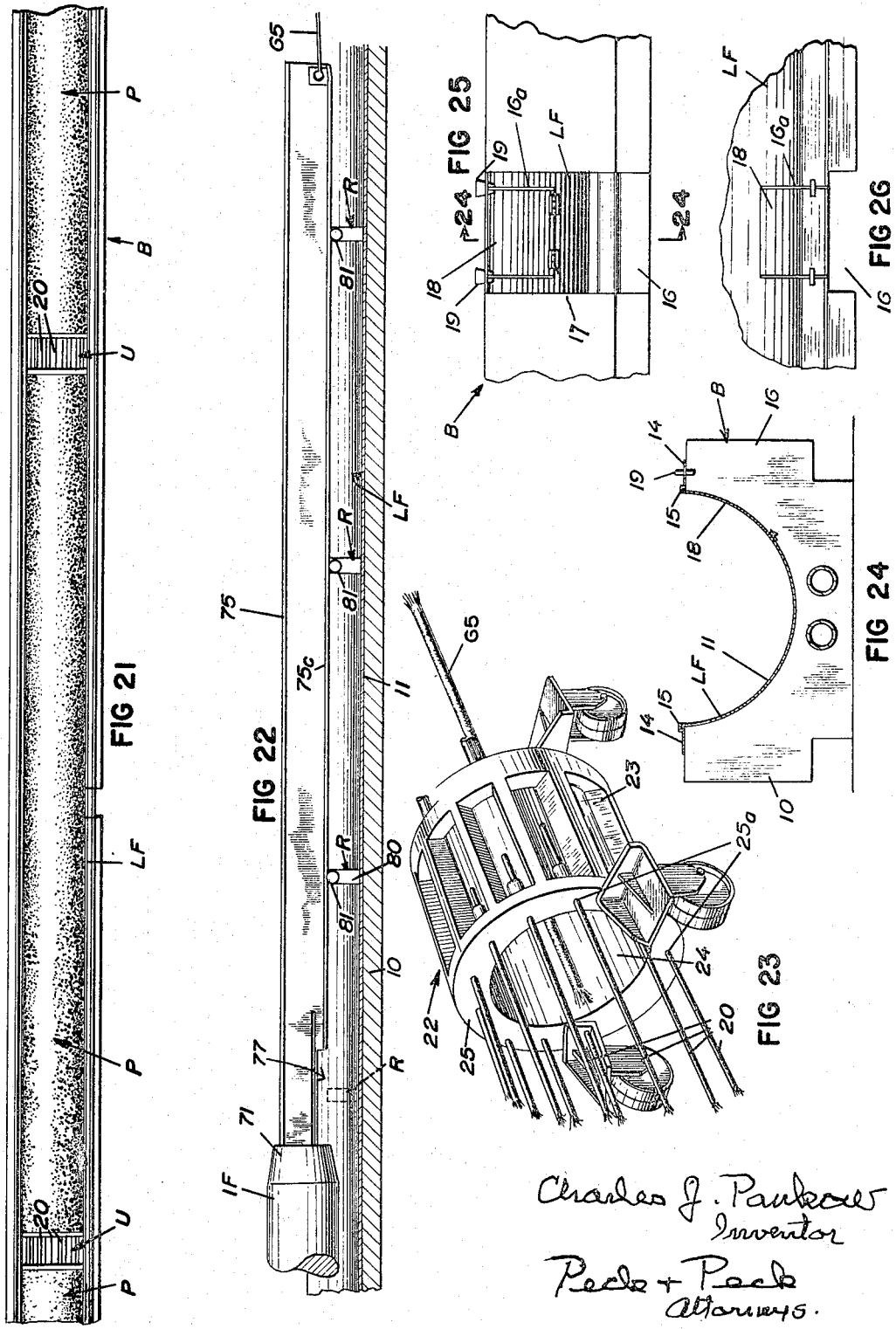

United States Patent Office 3,276,092
Patented Oct. 4, 1966

3,276,092
APPARATUS FOR CASTING HOLLOW REINFORCED AND PRE-STRESSED MEMBERS
Charles J. Pankow, Altadena, Calif., assignor to Peter Kiewit Sons', Inc., Omaha, Nebr., a corporation of Delaware
Filed July 30, 1962, Ser. No. 213,343
4 Claims. (Cl. 25—118)

My present invention relates to apparatus for casting hollow reinforced and pre-stressed members, and is particularly directed to the provision of such apparatus for casting hollow reinforced and pre-stressed piling of concrete; and the nature and objects of the invention will be readily recognized and understood by those skilled in the arts to which the invention relates in the light of the following explanation and detailed description of the accompanying drawings illustrating what I at present consider to be preferred embodiments or mechanical and structural expressions of apparatus of my invention, from among various other embodiments, expressions, designs, constructions and combinations of which apparatus of the invention is capable, within the broad spirit and scope of the invention as defined in and by the claims hereto appended.

In certain types of building construction, such for example, as trestle types of bridge constructions and similar forms of structures, large numbers of concrete piles are required of substantial but varied lengths which for strength and other reasons well understood in the construction art, are preferably and in many instances are required to be of hollow, reinforced and prestressed constructions. Each building structure, particularly such structures as bridges, must be designed and constructed to meet certain geographic, general and local climate, and use and load conditions peculiar to the location of the structure, so that components, such as concrete piles, must be specially formed for the design and construction requirements for such components for each particular structure.

Usually where such members as concrete piles of large dimensions and weights are required, the piles are cast and produced on a site as near the structure being built as possible because of the cost and difficulties, including the time required, of distance transportation and handling. This necessitates the erection and installation on the selected site of complete pile casting and production equipment at large cost for the primary purpose of supplying the one building structure, so that the costs of the piles produced thereby are high. And with the apparatus and equipment now in use and available in the construction industry for casting concrete piles, and particularly hollow concrete piles of reinforced and pre-stressed construction, the production time is high with the attendant high labor costs which added to the high cost of the production equipment and its erection, makes such piles expensive.

It is a primary object of my invention to provide apparatus and methods for the quantity production of concrete piles by casting, and particularly concrete piles of the hollow, reinforced and prestressed types, by which production time and labor costs are substantially reduced while the quality of the piles is appreciably improved with such quality improvement uniformly maintained throughout the quantity production of the piles.

A further object is to provide apparatus and methods for the quantity production by casting of hollow, reinforced and prestressed concrete piles by which a number of piles are progressively cast to predetermined lengths in end-to-end relation along a casting bed by continuous and uninterrupted casting throughout the casting run along the casting bed.

Another object is to provide apparatus by which the longitudinally disposed reinforcing and prestressing strands for reinforced and prestressed cast concrete piles may be efficiently and precisely positioned and maintained in position and stressed as single unbroken strands along a casting bed for casting into a plurality of piles progressively cast along a casting bed by a continuous operation through a casting run along the casting bed.

A further object is to provide a method for progressively casting a plurality of hollow concrete piles in end-to-end relation along a casting bed by which concrete mix is continuously progressively poured along the casting bed in the direction of the casting run and in which the poured concrete mix is simultaneously shaped and formed internally and externally into hollow pile form with the forming cast hollow piles being progressively supported internally to maintain the form and shape as cast until a condition of set is attained at which the formed concrete pile is shape sustaining.

Another object is to provide apparatus of relatively uncomplicated form structurally and mechanically for carrying out the foregoing method by utilizing a movable inner form and a movable outer form into which the concrete mix is poured over and around the inner form and simultaneously independently moving these inner and outer forms continuously along a casting bed during a casting run to progressively cast a plurality of hollow concrete piles along the casting bed.

A further object is to provide a design, construction and mounting for such simultaneously movable inner and outer forms by which these forms may be continuously moved along an assembly of reinforcing strands stretched in stressed condition over a casting bed in proper relation therewith and without interference by such reinforcing strands.

Another object is to provide a simple but efficient design of movable inner form with a mounting and supporting structure extending forwardly from the leading end of the inner form and movably engaged on support members supported from the casting bed for accurately positioning the inner form on its movements along and over the casting bed during a casting run.

A further object is to provide an inner form made-up of detachable sections for removal of a section to shorten the length of the inner form or for the addition of a section to increase the length of the inner form.

A further object is to provide a coupling for detachably connecting an inner form section to the trailing end of the inner form or of a section of the inner form, which will be positive in operation and in coupling position will accurately axially aline a section with the inner form and maintain such accurate alinement during the continuous movement of the inner form through a casting run.

Another object is to provide separate and independent, variable speed, powered draft means for moving the independent inner and outer forms for simultaneously independently moving the forms at the same rate of speed or for moving the forms at selected different rates of speed relative to each other.

A further object is to provide a design and construction of the outer movable form to include as a unit structure therewith a concrete mix receiving hopper for the continuous feed or pour of concrete mix thereform with an efficient divider or distributor structure forming opposite side discharges therefrom for feeding the concrete mix to and around the movable inner form as the outer form and the inner form are moved along during the casting run.

Another object is to design and construct the leading end of the movable outer form to protect against and compensate for the effects of bubbling and of the vibration of the concrete mix in the hopper of the outer form as the mix is poured from the hopper into the outer form and around the inner form during the movements of these forms through a casting run.

A further object is to provide a design and arrangement of bulkhead units for mounting and positioning at spaced intervals along the casting bed to define and determine the lengths of the piles to be progressively cast therebetween during a casting run.

Another object is to so design, construct and mount such bulkhead units as to receive, engage and maintain the desired accurate positioning of a stressed assembly of reinforcing strands stretched over and along a casting bed for casting of such strands in the piles to be progressively cast between the spaced bulkhead units along the casting bed.

A further object is to form such bulkhead units of spaced bulkheads to form a space between the adjacent ends of adjacent piles being progressively cast along the casting bed with the stressed strands of a reinforcing strand assembly bridging such spaced bulkheads of each bulkhead unit in positions readily accessible for severing or cutting to relieve the stressed condition thereof to complete the pre-stressing of the adjacent piles and to separate such piles for removal from the casting bed.

Another object is to provide a design and construction of a casting bed with a lower half form mounted in fixed position thereon for operative cooperation and relationship with the movable inner and outer forms of the invention for carrying out the continuous casting method, in which passages are formed transversely through the casting bed and lower half form at intervals therealong for the insertion of a tool for engaging and removing a completed pile from the casting bed, and such passages are normally closed during the progressive casting of the piles along the casting bed.

And a further and general object is to appreciably improve the art of quantity production of cast hollow, reinforced and pre-stressed concrete piles by substantially increasing the strength and quality and decreasing the cost of the completed piles prepared for installation and use.

With the foregoing and various other objects, features and results in view which will be readily apparent to and recognized by those skilled in the arts to which my invention relates from the following explanation and detailed description, my invention consists in certain novel features in design and in costruction of parts, elements and components, and in combinations thereof, as well as in method and in the steps and sequences thereof, all as will be more fully and particularly referred to and specified hereinafter.

Referring to the accompanying drawings in which similar reference characters refer to corresponding parts and elements throughout the several figures thereof:

FIG. 1a is a side elevation of the starting end of a casting bed showing the trailing portion of the outer slip form after the starting of a casting run and the inner slip form supported on the temporary cradle or way extending forwardly therefrom to and into the outer slip form, and also showing the reinforcing strands in position attached to the positioning and tensioning dolly and extending over the lower form and casting bed and into and through the outer slip form.

FIG. 1b is a side elevation in continuation of FIG. 1a showing a portion of the casting bed and the outer slip form in operative position thereon with a portion of the reinforcing strands and reinforcing spiral thereon extending forwardly in operative position from the outer slip form and along the casting bed over the lower form.

FIG. 1c is a side elevation in continuation of FIG. 1b showing the front or casting run completion end of the casting bed with the forward ends of the reinforcing strands attached to a positioning and tensioning dolly, and further showing in end elevation the winding drum of the variable speed winch for moving the outer slip form along the casting bed during a casting run.

FIG. 2 is a top plan view, more or less schematic, showing two, parallel casting beds with the reinforcing strand positioning and tensioning units at opposite ends of said casting beds and reinforcing strands positioned thereby over the casting beds, and with the winding drums of the variable speed winches and draft lines therefrom shown at the completion end of one of the casting beds.

FIG. 3 is a vertical transverse section through the casting bed, lower form, cast concrete pile, and inner slip form, with the trailing end of the outer slip from being shown in elevation, taken as on the line 3—3 of FIG. 1a.

FIG. 4 is a detail perspective view of one of the removable support roller units for the support beam member of the inner slip form.

FIG. 5. is an enlarged detail view in vertical transverse section through one rail of the track provided along opposite sides of the lower form showing the runner or slide member of the outer slip form at the adjacent side thereof in position slidably mounted and engaged on the rail.

FIG. 6 is a transverse vertical section through the hopper component of the outer slip form, taken as on the line 6—6 of FIG. 7.

FIG. 7 is a top plan view of the hopper component of the outer slip form.

FIG. 8 is an edge or side elevational view of a bulkhead unit for mounting on the casting bed in the lower form thereon, showing the mounting and engagement therein of some of the reinforcing strands.

FIG. 9 is a view in side elevation of one of the ring assemblies of the bulkhead unit of FIG. 8, with the reinforcing strands shown in section in position locked therein and extending therethrough.

FIG. 10 is a view in side elevation of the inner slip form and support beam member extending forwardly from the leading end thereof, the leading end of the inner slip form being shown in vertical longitudinal section showing the mounting of the support beam member in the leading end of the inner slip form.

FIG. 11 is a transverse sectional view through the inner slip form taken as on the line 11—11 of FIG. 10.

FIG. 12 is a transverse sectional view through the inner slip form taken as on the line 12—12 of FIG. 10, and showing the weighting bars strapped in position therewithin.

FIG. 13 is a vertical longitudinal section through the trailing portion of the body structure of the outer slip form taken as on the line 13—13 of FIG. 1b.

FIG. 14 is a perspective view of the leading end or front of the outer slip form and hopper unit on the casting bed, viewed from a location a distance along the casting bed in advance of the outer slip form, and showing a portion of the reinforcing cage and leading end of the inner slip form and support beam therewithin.

FIG. 15 is a view in vertical longitudinal section taken through the trailing end of the inner slip form and the leading end of a trailer section in position for coupling to the inner slip form, the coupled and mounted position of the trailer section on the trailing end of the inner slip form being indicated by broken lines.

FIG. 16 is a view in end elevation of the trailing end of the inner slip form and its coupling pin, as shown in FIG. 15.

FIG. 17 is a front end elevation of the leading end of the trailer section shown in FIG. 15.

FIG. 18 is a transverse section through the leading end of the trailer section shown in FIG. 15 and taken as on the line 18—18 of FIG. 15, to show the coupling mechanism mounted therewithin for detachably connecting the trailer section to the trailing end of the inner slip form.

FIG. 19 is a detail transverse horizontal section taken as on the line 19—19 of FIG. 18.

FIG. 20 is a detail section taken as on the line 20—20 of FIG. 19, and showing the operating screw and nut members for opening and closing the pivoted blades of the coupling mechanism for detachably coupling the trailer section to the coupling pin projecting from the trailing end of the inner slip form.

FIG. 21 is a top plan view of a portion of the length of the casting bed and lower form upon the completion of a casting run showing two of the spaced bulkhead units separating adjacent end-to-end piles with the covers removed from the bulkhead units to expose the reinforcing strands for severing to separate the piles for removal from the lower form.

FIG. 22 is a vertical longitudinal sectional view through the casting bed and lower form with the reinforcing cage removed and showing the support beam of the inner slip form in position supported on the removable spaced roller units in side elevation, the previous position of the most forwardly located roller unit at the cut-out at the inner end of the support beam being shown in dotted outline in position before its removal and remounting as the most forward of the roller units.

FIG. 23 is a perspective view of one of the reinforcing strand positioning and tensioning dollies.

FIG. 24 is a vertical transverse sectional view taken through the casting bed and lower form at one of the access doors through the lower form taken as on the line 24—24 of FIG. 25.

FIG. 25 is an outer side elevational view of one of the access doors through the lower form in closed position located at the inner end of the alined passage thereto through the casting bed body structure.

FIG. 26 is a detail view in top plan of an access door and adjacent portions of the casting bed body structure and lower form.

FIG. 27 is a view in top plan of the body structure of the outer slip form.

FIG. 28 is a view in side elevation of the body structure of the outer slip form.

For the purposes of describing the principles and features of my invention I have selected as an example expression thereof an actual, successfully operating installation which incorporates apparatus of the invention for the continuous casting of hollow, cylindrical, reinforced and pre-stressed concrete piles by the method of the invention. This example installation is designed and set up for the casting of such reinforced and pre-stressed hollow concrete piles which have an external diameter of 24" and an internal diameter of 15" in individual pile lengths of from 70' to 85'. A plurality of casting beds B in spaced, generally parallel relation are utilized in the example installation and each of these casting beds has a length of approximately 900' to provide a casting run for progressively casting therealong a plurality of piles of the desired individual lengths having an aggregate or total length of piling up to approximately the order of 875'. However, as the casting beds of the example installation are substantially identical only one of such beds will be described herein. With this particular example installation the over-all time of a casting run for casting a plurality of such piles having an aggregate length of piling of approximately 875' is from approximately 5 to 6 hours, depending upon weather, temperature, and various other factors recognized by those skilled in the art of concrete casting. Hence, with this installation having the plurality of casting beds B it is possible by starting a casting run on one of the casting beds at the beginning of an 8-hour shift for a working crew to finish the casting run well within the time of the shift and have time remaining sufficient to set up and prepare an adjacent casting bed for operation thereof for a similar casting run to be started on the following morning. Or, where but a single casting bed B is utilized, a casting run is thus finished well within the 8-hour working shift so that the crew for that shift has time remaining within which to start the preparation and conditioning of this single casting bed for the next casting run therealong.

Basically, an apparatus of my invention consists in the combination of the following major components: a casting bed, such as one of the casting beds B of the selected example installation as disclosed in the accompanying drawings, with the lower half form or invert LF mounted thereon and extending throughout the length thereof; an upper or outer slip form unit UF which is slidably mounted on and over the casting bed B and lower half form or invert LF for movement axially therealong and thereover; and the inner slip form or core unit IF over and around which concrete is poured from the outer slip form UF as the latter is moved along the casting bed B and the lower half slip form or invert LF. An essential feature which constitutes a primary part of the combination of components in an apparatus and which forms and provides a basic and critical step of the method of my invention, is the continuous movement simultaneously but independently of each other of the outer slip form UF and the inner slip form IF along a casting run from the start of that run at one end of the casting bed to the completion of the run at the opposite end thereof with continuous casting and progressive, pile-by-pile formation of the hollow, reinforced and pre-stressed plurality of piles in end-to-end, axially alined relation along the casting bed, while concrete mix is continuously poured from and through the outer slip form, to and around the inner slip form to continuously cast the piles around said inner slip form with the outer slip form and the fixed lower half form shaping and forming the exterior of the piles as slip forms UF and IF are continuously simultaneously moved over and along the casting bed.

In accordance with the invention the inner slip form IF has a length in direct relation to the rate of speed of displacement of the outer slip form UF and the inner slip form IF along the casting bed during the casting run, to the plasticity of the concrete, to the rate of set of the concrete or any combination of these factors, in order that the inner slip form will afford support to the forming and setting concrete as the slip forms are displaced along the casting bed to thereby permit sufficient setting of the concrete for it to be shape-sustaining in the formed pile before the inner slip form is moved along from and leaves any portion of the forming pile. Thus, following the principles and method of my invention, the hollow piles are progressively cast by the continuous simultaneous but independent movements of the outer slip form UF and the inner slip form IF along the casting bed B and its lower half form LF in a continuous casting operation from the start of the displacement of the outer and inner slip forms at one end of the casting bed to the completion of the casting run at the opposite end of the casting bed.

The reinforcing and pre-stressing of the hollow piles of the selected example is accomplished by positioning and stretching into tensioned condition a plurality of reinforcing strands or cables in positions spaced equidistant apart around and spaced equal distances from the axis of the piling to be cast. A suitable reinforcing wire spiral may be tied on and around the exterior of the longitudinally disposed reinforcing strands to provide a reinforcing cage assembly positioned along the casting bed so that the concrete pour from the outer slip form UF covers and imbeds this reinforcing cage to locate the cage in the walls of the piles, with the outer slip form and the inner slip form so designed and constructed that they are displaced on and along this reinforcing cage without interfering with such cage or interruption by the cage to the continuous displacement of the outer slip form UF and the inner slip form IF along the casting bed in the continuous pile casting run of the apparatus of the invention.

*The casting bed*

In the example installation of apparatus of the invention having the plurality of casting beds B these casting beds are substantially identical and referring to FIGS.

2 and 3 of the drawings, a casting bed B comprises a bed structure 10 of concrete having in this instance an overall length of approximately 900' with a semi-cylindrical section, open top trough 11 formed therein and extending throughout the length thereof which receives and in which is mounted and fixed the lower, semi-cylindrical section half form LF for defining and forming the lower half portion of the piling to be cast therein along the length of the casting bed.

The lower half form LF is preferably fabricated from suitable sheet steel and is provided along its opposite upper edges with the opposite outwardly extending flanges 14 which rest on and are fixed to the upper surfaces of the bed structure 10 on opposite sides of the casting bed B along the opposite upper edges of the trough 11. Each flange 14 is provided on the upper side thereof along the inner edge of the flange with the guide rail or slideway 15 with these guide rails forming a track for receiving and mounting thereon the outer slip form unit UF of the apparatus for displacement of this unit UF in position over and along the lower half form LF, as will be clear by reference to FIGS. 3 and 5, in particular.

At spaced intervals along at least one side of the bed structure 10 of a casting bed B openings or passageways 16 are formed transversely through the bed structure and a plate section of the lower form LF is cut out to provide an opening 16a therethrough, which plate section is then pivotally mounted or hinged at 17 on the inner form to provide a door 18 which may be swung downwardly to open the alined passageways 16 and 16a through the bed structure and the lower form for insertion of a suitable tool such as a pipe clamp or tong-like instrument for partially encircling and engaging a cast pile in the lower form 12 for removing the pile. The doors 18 may be suitably removably locked against swinging outwardly to open positions under the pressure thereon of concrete mix in the lower form LF, by removable wedge members 19 engaged between the doors and the lower form.

*The positioning and tensioning of the pile pre-stressing reinforcing strands*

The piles P produced by the apparatus and methods of my invention are reinforced by casting in and longitudinally through the wall of the pile a plurality of tensioned or stressed strands which upon completion of the piling are unloaded by removing the tension forces therefrom so that a pile is placed under compression and thereby prestressed. In the 24" external diameter piling produced by the installation of my invention of the selected example, thirteen (13) reinforcing and prestressing strands 20 are provided. The reinforcing strands 20 are fixed in positions stretched along and above and parallel with each other and alined and parallel with the lower form LF on the casting bed B, around and concentric with the longtiudinal axis of the piling to be cast. These reinforcing strands 20 are positioned in parallelism spaced equal distances apart around and at equal radial distances from the axis of the piling and extend over the lower half form LF for the full length of the latter. In the example installation, referring now to FIG. 2 in particular, a pile tensioning unit identified in its entirety by the reference character T is located and mounted in fixed position at and spaced from the end of the casting bed B at which a casting run is started. This positioning and tensioning unit T includes hydraulically operated strand tensioning jacks 21 operating a roller or wheel mounted, mobile strand positioning and stress-applying dolly 22. Referring now to FIGS. 1a, 1c, 2 and 23, the dolly 22 is in the form of a broad band ring or sleeve member 23 having in accordance with my invention the central opening or bore 24 therethrough, for a purpose to be referred to and described hereinafter. The sleeve member 23 is provided at the forwardly located or front side thereof with a vertically disposed and radially outwardly extending ring flange 25 therearound having the strand receiving and spacing apertures 25a formed therethrough at equally spaced locations around the flange 25. A dead end pull head identified generally by the reference character T' is mounted spaced a distance from the casting run completing end of the casting bed B, that is, the end of the casting bed opposite the starting end at which the tensioning unit T is located, and this dead end pull head T' takes the form of a dolly 22' similar to the dolly 22, which is secured and anchored in fixed position in axial alinement with the dolly 22 of the tensioning unit T, as will be clear by reference to FIGS. 1c and 2. The ring flange 25' of the dolly 22' of unit T' has its strand receiving apertures 25a axially alined with the corresponding apertures 25a of the dolly 22 of the tensioning unit T that is located at the opposite or casting run starting end of the casting bed B.

The thirteen (13) reinforcing strands 20 have their opposite ends extended through the alined apertures 25a of the dollies 22, respectively, at the opposite ends of the casting bed B and are suitably fastened therein in positions stretched between the dollies over and along the lower half form LF. The strand tensioning jacks 21 of the unit T are then operated to draw the dolly 22 of this unit away from the fixed and anchored dolly 22' of the dead end pull head unit T', to thus stretch and tension the reinforcing strands 20 to the desired degree at which the strands are to be stressed and maintained by the tensioning jacks preparatory to and during a casting run.

Usually a spiral of reinforcing wire 26 is placed on and wound around the exterior of the assembly of stretched and stressed reinforcing strands 20. This spiral 26 extends around the assembly of reinforcing strands for the length of the lower half form LF. The reinforcing spiral 26 is then tied or attached at intervals along the strand assembly to the strands thereof by suitable ties such as the wire ties 26a, thus forming an annular reinforcing cage in a manner generally familiar in this art.

*The outer slip form unit*

The outer slip form UF is comprised of a unit assembly which includes the slip form body structure 30 and the concrete mix containing and feeding hopper H at and extending forwardly from the forward or leading end 31 of the body structure 30 in position extending vertically upwardly therefrom and forming a unitary structure therewith.

The body structure 30 of the outer slip form UF comprises the semi-cylindrical, upwardly and transversely arched structure consisting of the semi-cylindrical, upwardly arched transverse rib members 32 of angle section spaced apart longitudinally along the body 30 and the upwardly and transversely arched wall 33 extending across and between and fixedly connected to the under sides of the transverse rib members both longitudinally and transversely therof. This wall 33 provides the upwardly arched semi-cylindrical body structure with the inner surface 34 of this closed wall 33 shaped to define and forming the upper half of the molding or casting cavity, with the portion of the semi-cylindrical lower form LF therebelow then forming the lower half of the complete casting cavity into which the concrete mix is poured and set therein to pile form as the outer slip from UF is moved along the lower form LF on the casting bed B.

The hopper unit H is located at the forward end of the outer slip form body structure 30 and is connected to and forms a unitary structure therewith, with the lower or bottom discharge portion 40 of the hopper forming, in effect, a forward continuation of the body structure 30. The hopper H extends a distance vertically upwardly above the body structure 30 and at the upper or top side 41 thereof provides the enlarged open top intake or charging opening 42 for receiving therethrough the supply of concrete mix to form the charge of mix for a casting run of the outer slip form UF and the hopper H as a unit assembly along the casting bed. At the forward side of the lower or bottom portion 40 of the hopper H, a shield or guard G in the form of an upwardly and transversely arched wall 43 is mounted in fixed position on and extending forwardly from the hopper unit H. The wall 43 forming the shield G provides, in effect, a leading end continuation of the semi-cylindrical body structure 30 and of the inner surface 34 of the wall 33 of the semi-cylindrical body structure 30 of the outer slip form UF. This leading end shield wall 43 is upwardly arched into semi-cylindrical form having substantially the same radius of curvature as the semi-cylindrical upwardly arched wall 33 of the body structure 30, and the lower opposite side portions thereof are extended forwardly and of progressively forwardly decreasing height to provide the forwardly extending wings 43a, as will be clear by reference to FIG. 1b of the drawings in particular. Thus, this leading end shield G moves along the casting bed B with and ahead of the hopper H as the outer slip form UF and hopper H move as a unit assembly through a casting run with this shield G arching in spaced relation over the upper half of the reinforcing cage formed of the strands 20 and the reinforcing wire spiral 26.

The hopper H is provided with the usual vibrators V mounted in suitable positions thereon and therein to continuously vibrate the charge of concrete in the hopper during a casting run of the outer slip form UF over and along the casting bed as the concrete mix is poured and discharges from the hopper. These vibrators V which are more or less schematically shown in FIGS. 1b and 7 of the accompanying drawings, may be of the conventional compressed air operated types well known in the art, with each vibrator V connected by a compressed air line 44 with a suitable source of compressed air, such as the compressed air tank 45 which may be suitably mounted in position supported from and across the rear side of the hopper H above the body structure 30 of the lower slip form, as generally shown in FIG. 1b and FIG. 14.

As the continuously vibrated charge of concrete mix in the hopper H is poured and discharges from the hopper rearwardly into the casting space provided around the inner slip form IF and between the lower form LF and the outer slip form UF, and as these slip forms move forwardly along the casting bed B through a casting run, there is a build-up of concrete mix at the discharge from the hopper H within the outer slip form UF which tends to extend to and beyond the forward side of the lower or bottom portion of the hopper H. The shield G contains and confines therewithin such overflow or forward build-up of concrete mix. Due to the hydrostatic pressure of the charge of concrete in the hopper H and the fact that this charge of concrete is being continuously vibrated as it is poured and discharged from the hopper H, there is generated a so-called forward "bubbling effect" which takes place within and which is taken care of by the leading end shield G and by positioning the inner slip form IF to project through and a distance beyond the outer slip form UF, as the outer slip form moves forwardly along tthe casting bed B simultaneously with the forward movement of the inner slip form. It is to be further noted that the side build-up of concrete mix is contained by the opposite side, forwardly extending wings 43a of the shield wall 43. An increase in fluidity of the concrete or the exertion of greater pressure from the hopper would require an increase in the length of the forwardly projecting portions of both the upper slip form and the inner slip form.

The hopper H includes the opposite side walls 46 and 47, the upwardly and rearwardly inclined rear wall 48, and the forwardly and upwardly inclined forward wall 49. The forward wall 49, referring now to FIG. 7 of the drawings, extends rearwardly and downwardly to the bottom discharge from the hopper identified generally by the reference character 50 and includes a downwardly and rearwardly inclined reduced width wall section 51 which extends to and terminates at an approximate midway point of but spaced inwardly from the opposite side walls 46 and 47, so as to divide the forward area of the discharge opening 50 into the opposite side, reduced width spaces 52 at and along opposite sides of the wall section 51. A divider plate unit identified generally by the reference character D is provided in position mounted along the longitudinal center of the bottom discharge opening 50 from the hopper H, between and connecting the inner end of the wall section 51 with the opposite lower portion of the rear wall 48. This divider unit D includes the opposite side walls 53 which are joined and merged along their upper edges into the edge 54 and which diverge downwardly and outwardly from the edge 53 with their lower edges terminating and located in a transverse horizontal plane adjacent the plane of the hopper bottom discharge opening 50. The over-all width of the divider unit D is in this instance less than the inner lower edge of the wall section 52, and of course is less than the width of the bottom discharge opening 50. The divider unit D thus divides and forms the rear half portion or area of the bottom opening 50 into the opposite side discharge openings 55 for the discharge of the concrete mix therethrough. Hence, the charge of concrete mix from the hopper H is directionally controlled by the divider unit D, the forward wall section 51 and the opposite side discharge openings 55 into two lines of flow directed downwardly to opposite sides of the inner slip form and the surrounding reinforcing cage with the top portion of the upper side of the inner slip form shielded and protected against direct pour or discharge of concrete mix thereonto. In this manner the concrete is poured into the casting space at both sides of the inner slip form but not onto the upper side thereof, and thus first fills the casting space beneath the inner slip form and between it and the lower form and then progressively builds-up over the opposite sides of the inner slip form and the reinforcing cage therearound and finally onto and over the upper side of the inner slip form IF and the reinforcing cage which surrounds it. The outer slip form UF thereafter progressively forms and shapes the concrete mix on and over the upper side of the inner slip form and the reinforcing cage into the desired shape of the upper side of the pile being cast as it moves along through its casting run.

The hopper H may be of any desired or suitable construction but in this example, referring now to the somewhat schematic sectional view of FIG. 6, may be considered to be built-up of the spaced vertically disposed main frame members 40a and 40b and cross members 40. The opposite side walls 46 and 47, the rear wall 48, and the forward wall 49 are rigidly secured over and across the inner sides of the main frame members 40a. These vertical frame members 40a and 40b are joined and connected at their lower ends with and to the forwardly extending longitudinals 33a of the body structure 30 and the upwardly arched semi-cylindrical wall 33b which extends forwardly across the lower end of the hopper H in forward continuation of the wall 33 of body structure 30 of the outer slip form UF. The discharge opening 50 which forms the bottom discharge opening of the hopper H, as hereinabove described, is formed and provided through the upper side of this wall 33b, as shown particularly in FIG. 6 of the drawings.

The body structure 30 of the outer slip form UF is provided on the top portion of the upper side thereof with a screed blade member S1 which extends in position disposed transversely relatively to the wall 33 in position spaced a distance rearwardly along body structure 30 from the hopper H. The screed member S1 is of arcuate shape longitudinally and has the inner edge 33c curved or arcuate on a radius of curvature the same as the radius of curvature of the upper side of the pile to be cast. The screed blade member S1 is positioned and mounted with the inner arcuate edge 33c thereof exposed at the inner side of wall 33, that is, at the inner surface 34 of this wall 33, in position to make preliminary contour forming and shaping contact along and over the concrete mix poured and deposited by the outer slip form UF as the latter moves along through its casting run. A second screed blade member S2 generally similar to the screed blade member S1 is mounted in position transversely across the upper side of the outer slip form body structure 30, at a location spaced a distance thereon rearwardly from the screed blade member S1. This screed blade member S2 has the arcuate inner edge 33d thereof exposed at the surface 34 of wall 33 in position for contour and shape-finishing engagement with the pile forming concrete mix within the outer slip form UF as the latter moves through its casting run. Thus, screed blade member S1 performs a preliminary or "rough" shaping operation, while the following, rearwardly located screed blade member S2 performs a "finishing" shaping and contouring operation for final setting of the concrete mix into the desired exterior contour and shape of the piling to be cast.

A grout hopper GH is mounted on the upper side of the body structure 30 of the outer slip form UF in position spaced rearwardly therealong from the finishing screed blade member S2 immediately adjacent the trailing end of this body structure. This grout hopper GH has a bottom discharge opening for feeding grout onto the upper side surface of the forming and setting pile P which is being cast so as to fill up small holes in the concrete resulting from both air and water being vibrated to the top surface of the collecting mass of concrete mix in the lower form LF and the outer slip form UF.

A trowel unit E is mounted in position spaced from and trailing the trailing end of the body structure 30 of the outer slip form UF, as shown particularly in FIG. 1b of the drawings. This trowel unit E is of semi-cylindrical, arched shape having the inner surface 33e thereof formed on substantially the same radius of curvature as that of the desired external contour of the upper surface of the pile. The trowel unit E, when in operative position, fits over and across the pile P as it is formed and cast by the forwardly moving outer and inner slip forms UF and IF during the casting run. In accordance with this feature of my invention the trowel unit E is mounted and secured between spaced opposite side bars 33f which extend forwardly from the trailing end of the body structure 30 and which are pivotally connected by the pivots 33g, respectively, to opposite sides of the body structure. Thus the trowel unit E with bars 33f may be swung upwardly to inactive position when for any reason it is desired not to finish trowel the forming pile, as indicated by the dotted line position of trowel unit E in FIG. 28. This trowel unit E, when in operative position, does a final smoothing-off of the forming and setting pile P to provide an upper surface thereon of a finer and higher degree of smoothness than the upper surface formed by the screed blade S2 as treated by grout from the grout hopper GH.

The outer slip form UF is slidably mounted and supported in position on the casting bed B over the lower form LF, by the opposite side rails 15 which extend along and project upwardly from the opposite side flanges 14, respectively, of the lower form LF. The rails 15 are located on the flanges 14 with their inner surfaces substantially flush with the inner surface 14a of the lower form LF so that when the outer slip form UF is in mounted position on the casting bed B, the opposite lower edges of the wall 33 aline with the upper edges of the lower form LF with the inner surface 34 of the wall 33 flush with and forming a substantially unbroken continuation of the inner surface 14a at the lower form LF, as will be clear by reference to FIG. 3 of the drawings. Thus the lower form LF and the wall 33 of the body 30 of the outer slip form UF form, complete and maintain a complete molding or casting cavity of the required cylindrical section for casting and forming therein the piles P. The body structure 30 of the outer slip form UF is provided with the horizontally disposed, outwardly projecting flanges 37 rigidly secured on and along the opposite sides of the semi-cylindrical wall 33 along and adjacent the opposite lower edges thereof in positions to rest on and slidably engage the rails 15 on the flanges 14 of the lower form LF. By such mounting the outer slip form UF is slidable on and along the rails 15 and confined by these rails to a linear path along the casting bed over and in casting cavity completing relation with the lower form LF. The outer slip form UF is held and confined to its straight-line, linear path of movement against lateral displacement therefrom by engagement of the outer sides of the wall 33 of the body 30 along and between the flanges 37 and the lower edges of the wall 33, engaging with the inner sides of the rails 15. Thus the outer slip form may be moved smoothly and uninterruptedly along its linear path on the rails 15 from one end of the lower form LF to the other end thereof.

In order to hold and maintain the outer slip form UF in position slidably engaged on the rails 15, the outer slip form is loaded with a considerable static weight mounted and carried on the upper side of the body structure 30 to the rear of the hopper H. In this particular instance the required load is applied by mounting and confining a large number of steel bars W on the upper side of the body structure 30, as shown particularly in FIGS. 1b and 3 of the accompanying drawings. The use of the substantial weight loading provided by the steel bars W supplies the necessary counterweight to hold the outer slip form UF in operative position on the rails 15 and further, there is produced thereby an expanding pressure against the wall 33 to tend to spread the opposite lower sides thereof and force the opposite lower edge portions outwardly against the rails 15 to thereby assure the maintenance of the desired full and complete cylindrical cross section for the casting cavity formed by the wall 30 of the outer slip form and the wall of the lower form LF.

The outer slip form UF is moved or displaced along the casting bed B on the rails 15 in operative position on and over the lower form LF, by a suitable draft line 60 which is connected to the outer slip form and is drawn by a suitable powered draft source. In this particular example a draft bar member 61 is fixed to the hopper H on the forward wall 49 thereof in position spaced above the shield G and an end of the draft line 60 is suitably coupled thereto at a central location thereon, as will be readily understood by reference to FIG. 1b of the drawings. The draft line 60 leads to and is wound upon the winding drum 62 of an electric motor powered winch unit identified generally by the reference character L in FIG. 2 of the drawings. This winch unit L and its winding drum 62 is driven by a variable speed electric motor 63 (further identified as such by the symbol "MVS"). Thus, by operating the motor 63 in the proper direction at the desired rate of speed, the drum 62 of winch unit L is rotated to wind thereon the draft line 60 and thus move and displace the outer slip form unit UF along the casting bed B over the lower form LF in the desired direction through a casting run.

In the particular installation which forms an example of the invention as herein presented, the length of the body structure 30 of the outer slip form UF is approximately 30', while the over-all length of the outer slip form, including the hopper component H thereof, is approximately 36'.

*Inner slip form unit*

The inner slip form IF following the principles of the invention provides the core member which forms the bore through the hollow cast pile and in accordance with an important feature of the invention, this inner slip form is mounted in core forming position extending through the outer slip form UF and extending a substantial distance rearwardly therebeyond over and along the lower form LF for purposes and results to be hereinafter discussed in more detail. Thus mounted, the inner slip form IF extends through and is surrounded by the reinforcing cage formed of the strands 20 and the wire spiral 26, and is simultaneously moved with the movement of the outer slip form but independently thereof both structurally and in its movement, throughout a casting run. This inner slip form IF in mounted position thereof thus provides a casting cavity therearound between it and the inner surface 34 of wall 33 of the outer slip form UF and the inner molding or casting surface of the lower slip form UF, with the reinforcing cage extending through this space spaced from the lower form and outer slip form in proper position for the casting within the wall of the piling as the piles are cast.

The inner slip form IF of the example installation hereof, referring now to FIGS. 10, 11 and 12 of the drawings, is in the form of a tubular casing 70 formed of a suitable metal such as steel, and of circular cross section to define the bore through a pile P as of circular section. It will be understood, of course, that the inner slip form IF may be of any desired section to form a hollow member such as a pile P having a desired section for the bore therethrough. The inner slip form IF has a constant external diameter throughout its length up to its leading end section 71, of 15" in order to form the piling P with an internal diameter of 15". This particular inner slip form IF of the example hereof has a length of 44'.

The inner slip form IF is closed at its trailing end 72 by an end wall or plug member 73 and at the inner end of the leading edge section 71 is closed by a transverse bulkhead 74 suitably secured therein and thereacross, as by welding, or in any other suitable manner. Thus, the inner slip form IF is of constant external diameter (15") from the location of the bulkhead 74 at the leading end thereof to the end closure wall 73 at the trailing end 72 thereof. The leading end section 71 is tapered inwardly and forwardly from the termination of the constant external diameter main body of the inner slip form to the reduced diameter forward edge 71a thereof.

The inner slip form IF is mounted in its operative position extending through the outer slip form UF and is supported and maintained in such position by a forwardly extending I-beam 75. This support beam 75 is rigidly secured at its rear end in and to the forward end of the tubular casing 70 of the inner slip form IF and at its forwardly projected, free and unattached forward or leading end is adapted to have connected thereto a powered draft line 65 for moving the inner slip form through a casting run. In this particular instance the rear end length of the I-beam 75 extends through the end bulkhead 74 within the tubular casing 70, to a bulkhead 76 secured in and across the tubular casing, as by welding, at a location spaced inwardly from the bulkhead 74. The bulkhead 74 is provided with cut-outs 74a to receive and permit the passage therethrough of the I-beam web 75a, upper flange 75b and lower flange 75c, with the web and flanges preferably welded to the adjacent portions of the bulkhead 74, as will be clear by reference to FIG. 11 of the drawings. Stiffening and reinforcing plate members 75d are secured at their inner ends to the bulkhead 74 and extend forwardly along and are attached to the web 75a and flange 75b of the support I-beam 75. A cut-out 77 is provided completely through the lower flange 75c and a distance upwardly into the web 75a of the support beam 75 at a location immediately adjacent and extending rearwardly to the forward edge 71a of the leading edge section 71 of the inner slip form IF, for a purpose to be described. The reinforcing members 75d stiffen the support beam 75 and provide stiffening compensation for the cut-out 77 through the lower flange 75c and into the web 75a of the support beam.

In mounted position the inner slip form IF is primarily supported and maintained in such mounted position by movably mounting the support beam 75 on roller units R which are removably mounted and supported on the bottom of the lower form LF in positions extending upwardly through spaces between the strands 20 and the wire spiral 26 of the reinforcing cage positioned over the lower form. Referring now to FIG. 4, in connection with FIG. 22, each of these roller units R includes a pedestal or frame 80 across the upper or operative end of which there is mounted a roller 81 for minimum friction, rolling engagement with the under side of the lower flange 75c of the support beam 75. Each of these roller units R has a height when supported on the bottom of the lower form LF, to place the upper, contact surface of its roller R in the required plane to horizontally position and support the support beam 75 and the inner slip form IF which is rigidly connected thereto, in the proper operative position of the inner slip form IF relative to and extending through the reinforcing cage and the outer slip form UF.

With the casting installation of the selected example having the inner slip form IF of a length of 44', the support beam 75 of the inner slip form has a length of approximately 20' with approximately 9' thereof extending into the leading end of the slip form. In proper position centered on and along the line of the axis of the piling to be cast, the inner slip form IF has its leading end located and positioned at or projected a distance beyond the leading end of the outer slip form UF with the support beam 75 extending forwardly along and movably supported over the lower form LF within and surrounded by the reinforcing cage. In the operation and use of the example installation, three (3) roller units R are utilized and are spaced 4' to 6' apart between their centers along the lower form LF with the lower flange 75c of support beam 75 resting on the rollers 81 of the roller units R, as will be clear by reference to FIG. 22. The innermost located roller unit R is spaced forwardly along support beam 75 a distance from the leading end 71 of the inner slip form IF with the other roller units R spaced apart forwardly along and movably supporting the support beam and the inner slip form IF rigidly connected therewith. During a casting run as the inner slip form IF is moved or displaced forwardly over and along the lower form LF, when the forward movement of the inner slip form and the beam 75 has moved the cut-out 77 to a position over and above the innermost roller unit R, this latter roller unit is disengaged and completely freed from the support beam 75 which is then supported on and by the two forwardly located and spaced roller units R. (See FIG. 10.) At this point and time a workman reaches in through the reinforcing cage and manually grasps and lifts the freed roller unit R that is located at the cut-out 77 (see FIG. 22) and removes this roller unit outwardly through the reinforcing cage and then reinserts and remounts it at a position along the lower form LF in advance of the leading end of the support beam 75 so that the support beam on further movement along the casting run reengages and is again movably supported on the roller 81 of such unit. This operation of removing the innermost roller unit and remounting it to a position spaced forwardly from the support beam 75 is repeated along and throughout the casting run until the completion of the run at or adjacent the finishing end of the casting bed B.

The inner slip form IF is heavily static weight loaded in order to compensate for hydrostatic up lift created by the fluid vibrating concrete mix. Referring now to FIG. 12, with the inner slip form IF of the design and construction used in the example installation, this static weight loading is carried out by mounting and securing a substantial number of steel bars W' within the tubular casing 70 of the inner slip form and securing such steel bars in fixed position against shifting by suitable ties or the like members 82 secured to the casing 70 of the inner slip form in positions transversely across and against the bars.

At the lower portion of the leading end of the support beam 75 a reinforced eye or transverse bore 83 is provided into and through which the draft line 65 for the inner slip form IF is connected and coupled. The draft line 65 extends forwardly to and is wound upon the winding drum 62' of an electric motor powered winch unit identified generally in FIG. 2 of the drawings by the reference character L'. The winch unit L' is completely independent of the winch unit L for the outer slip form UF. This winch L' and its winding drum 62' is driven by a variable speed electric motor 63' (further identified as such by the symbol "MVS"). Thus, by operating the motor 63' in the proper direction at the desired rate of speed, drum 62' of the electric motor powered winch unit L' is rotated to wind thereon the draft line 65 and thereby move and displace the inner slip form IF along the casting bed B through the mass of poured concrete mix therearound from the hopper H of the outer slip form UF with the inner slip form moving forwardly over and supported by the support beam 75 on the roller units R while the body of the inner slip form is held against displacement from proper position on the forming concrete mix therebelow by the static weight provided by the steel strips W.

With the inner slip form IF of this example, there is provided in fixed axial position extending rearwardly from the trailing end closure wall or plug 73, a coupling pin member 85 projecting rearwardly therefrom and having an enlarged, conical, rearwardly tapering coupling head 86 for detachable coupling thereto of a trailer section for the inner slip form, as will be hereinafter described.

*Trailer sections for the inner slip form*

By the invention trailer sections IFT are provided for detachable coupling to the inner slip form IF and to each other for increasing the length of the inner slip form to a desired length to meet the conditions presented by the plasticity of the concrete, the rate of set of the concrete, or any combination of these factors, as will be hereinafter more fully explained in connection with the method of the invention as carried out with the example installation. Each of the trailer sections IFT has the identical external diameter, in this instance, 15", as the inner slip form IF and a trailer section is detachably coupled to the trailing end of the inner slip form IF or to the trailing end of another trailer section IFT, with the forward end of the trailer section abutting the trailing end of the inner slip form or the trailing end of another trailer section so that the external surface which defines and forms the bore through a pile is continuous and unbroken from the leading end of the inner slip form to the trailing end of the rearmost trailer section.

A trailer section IFT and the detachable coupling mechanism K mounted in the leading end thereof for detachable coupling to the coupling pin 85 at the trailing end of the inner slip form IF, or to a coupling pin at the trailing end of a trailer section, is illustrated in detail in FIGS. 15 through 20 of the accompanying drawings.

The trailing end closure member or plug 73 of the inner slip form LF, referring now to FIG. 15, is formed of a tubular casing 100 of cylindrical cross section having an external diameter to fit and extend a distance within the trailing end of the inner slip form where it is welded or otherwise rigidly secured in position with the rear length thereof forming a trailer section mounting sleeve 101 projecting a distance rearwardly beyond the trailing edge 72a of the inner slip form. This end closure plug member 73 includes the end closure wall 102 thereacross which mounts and has rigidly connected thereto the axially rearwardly projecting coupling pin 85. In this example cross brace bars 102a are attached across the inner side of wall 102 and are attached at their ends to the casing 100. The rearwardly projecting portion 101 of the casing 100 may be inwardly bent or tapered for ease of entry into the leading end of the casing 103 forming the trailing section IFT. This leading end of the trailing section IFT maintains the constant internal diameter of the trailing section through to the leading edge 103a thereof. In detachably coupled and connected position of a trailing section IFT on and trailing the inner slip form IF, the projecting mounting sleeve portion 101 of the end closure plug 73 of the inner slip form, slip fits into the leading end of the trailing section IFT with the leading edge 103a of the latter abutting and engaged against the trailing edge 72a of the inner slip form, thus positioning the trailing section so that its exterior surface and contour therearound forms a complete rearward and unbroken continuation of the exterior surface and contour on and around the inner slip form IF.

Spaced a distance inwardly from the leading edge 103a of the trailing section IFT a transverse bulkhead 104 is mounted and rigidly secured in position in the casing 103 of the trailing section IFT, as by welding the edge of the bulkhead 104 to and around the casing 103 of the trailing section. The bulkhead 104 is provided with an axial opening or circular aperture 105 for receiving and free passage of the coupling pin and its coupling head 86 therethrough to and from coupling engagement by the coupling mechanism K. The coupling mechanism K is mounted on and located at the rear side of the bulkhead 104 within the casing 103 which forms the trailing section IFT, as will be clear by reference to FIG. 15 of the drawings.

The coupling mechanism K in the form of the selected example hereof, referring now to FIGS. 15 and 18, includes the pivoted coupling jaws or blades 106, of flat plate form positioned at the rear side of bulkhead 104 parallel therewith. The coupling blades 106 are pivotally or swingably mounted at the adjacent ends 106a thereof adjacent to the edge periphery of the bulkhead 104 on a pivot pin 107 fixed on bulkhead 104 in position normal thereto and extending rearwardly therefrom, as will be clear by reference to FIGS. 15 and 18. Thus pivotally mounted, the coupling blades 106 extend across the rear side of the bulkhead 104 at opposite sides of the axial aperture 105 through the bulkhead and are swingable about the pivot 107 to coupling position moved inwardly toward each other extending across aperture 105 to the full line position of FIG. 18, or to uncoupling position swung away from each other and clear of aperture 105 shown in broken lines in FIG. 18.

Each of the coupling blades 106 is provided at an intermediate location along the inner edge 106b thereof with a semi-circular recess 108, such recesses being so located and positioned that with the coupling blades in their inwardly swung coupling positions the recesses are opposite each other and alined to form a circular opening concentric with the aperture 105 in the bulkhead 104. A their rear sides opposite the bulkhead 104, the coupling blades 106 are, in effect, countersunk around the semi-circular recesses 108, respectively, to provide the reduced width semi-circular shoulder 108a around each said recess 108.

The actuating means for swinging the coupling blades 106 inwardly toward each other to coupling position or outwardly away from each other to uncoupling position includes, in this instance, a nut member 109 fixed on the rear side of each coupling blade 106 adjacent the outer free end thereof and an oppositely threaded actuating screw member 110 operatively connected threadedly into and through said nut members. The nut members 109 are fixed on the blades 106, respectively, with the threaded bores 109a (see FIG. 20) axially alined in position normal to the facing inner edges 106b of the coupling blades. The oppositely threaded screw member 110 has the oppositely threaded lengths 110R and 110L threaded through the internally threaded bores 109a, respectively of the nut members 109, and is provided at the central portion thereof between the inner ends of the opposite threading with a reduced diameter smooth surface bearing section 111. (See FIGS. 19 and 20). The actuating screw member 110 is mounted in a bearing plate 112 that is rigidly secured to the bulkhead 104 in position projecting rearwardly therefrom through and between the inner edges 106b of the coupling plates 106 at and between the nut members 109. The screw member 110 is rotatably mounted on and extending through the bearing plate 112 with the bearing section 111 rotatably mounted in an elongated bearing slot 112 through the bearing plate held against movement axially but movable bodily radially in and through the bearing slot, as will be clear by reference to FIGS. 19 and 20. The opposite ends of the oppositely threaded actuating screw 110 are provided with the usual flats for engagement by a suitable wrench or other tool inserted through one of the openings 114 provided in the casing 103 of the trailer section IFT opposite the opposite ends, respectively, of the actuating screw. If desired or found expedient, coupling blade guide bars 115 may be secured in fixed positions across the casing 103 at and across the rear side of the blades 106 but with operating clearance therewith (see FIG. 15).

In order to attach a trailer section IFT to the inner slip form IF, the coupling blades 106 are first swung to their open, uncoupled position by the actuating screw 110, and then the leading end of the trailer section is fitted onto and over the mounting sleeve 101 that projects rearwardly from the trailing end of the inner slip form with the leading edge 103a of the trailer section abutting the trailing edge of the inner slip form and with the coupling pin 85 of the inner slip form extending rearwardly through the axial aperture 105 through the bulkhead 104 into position between the coupling blades 106. The actuating screw member 110 is then rotated in a direction to swing the coupling blades 106 inwardly toward each other into coupling position around coupling pin 85 beneath the coupling head 86 and thus detachably couple and lock the trailer section in position on and to the inner slip form in uninterrupted trailing combination thereof. The trailer section IFT is readily uncoupled from the inner slip form IF by rotating the reverse threaded actuating screw 110 in a direction to swing the coupling blades 106 in directions away from each other to positions removed from and releasing the coupling pin 85 for withdrawal and detachment of the trailer section from the inner slip form.

Preferably a number of trailer sections IFT are or may be provided for coupling to the inner slip form IF and to each other to provide an inner slip form assembly of the required length in a particular installation or casting operation. To this end each trailer section IFT is provided in its leading end with a coupling mechanism, such as the coupling mechanism K of this example, and at its trailing end with a closure plug providing a trailer section mounting sleeve and coupling pin, such as the closure plug 73, mounting sleeve 101 and coupling pin 85 as used with the inner slip form IF of this example. Each trailer section IFT may be of any desired length, and in the example installation the trailer sections each have a length of 30' and two of such sections are used with the inner slip form IF having a length of 44' so that there is provided an inner slip form assembly having an overall length of 104'.

*The pile separating and reinforcing strand positioning bulkhead units*

With the installation of this example of the invention for carrying out the method of the invention, the individual piles P are progressively cast in end-to-end relation along the casting bed, and to separate the individual piles along the casting bed, as well as to maintain the proper positioning of the reinforcing strands 20, the invention provides a plurality of bulkhead units U spaced apart at the desired locations along the bed to form therebetween the casting spaces to cast therein the piles of the desired lengths. Each of these bulkhead units U is identical in design and construction so that a detailed description of one such unit U will suffice for purposes of this disclosure.

Referring now to FIGS. 8 and 9, in connection with FIG. 21, a bulkhead unit U comprises two ring assemblies 90 each of which is comprised of an outer ring 91 and a removable inner ring 92. The ring assemblies 90 of a bulkhead unit U are mounted and joined in a fixed, spaced and parallel relationship with the spacing of the ring assemblies 90 in a bulkhead unit U of the present example being approximately 12".

The outer ring 91 of each ring assembly 90 is provided with thirteen (13) notches in and opening through the inner edge thereof forming recesses 93. The recesses 93 are spaced equidistant apart around the outer ring 91 for receiving therein and extending therethrough the thirteen (13) reinforcing strands 20 of the example apparatus so as to maintain these strands in their proper spaced positions and securely hold them against radial displacement, as by sagging, along their lengths stretched between the dollies 22 and 22'.

The inner ring members 92 of the spaced parallel ring assemblies 90 of each bulkhead unit U are removably locked together in properly spaced, parallel relation against displacement relative to each other by a series of four (4) locking bars 95 extending therebetween in positions spaced substantially equidistant apart therearound (see FIG. 9.) Each of the locking bars 95 is provided at the opposite ends thereof with the radially inwardly extending wedge heads 96, respectively, disposed transversely of and tapering outwardly from the bar (inwardly when the locking bar is in mounted position). Each of the inner ring members 92 is provided with four (4) wedging socket members 97 on the inner side thereof disposed radially thereacross and open at their outer ends for receiving in wedging relation therein the wedge heads 96 of a locking bar 95. The inner ring members 92 are assembled in position in the outer ring member 91 of each ring assembly 90 of a bulkhead unit U, with the socket members 97 opposite and alined with each other, respectively. Each of the four (4) locking bars 95 is then removably mounted in position with its opposite end wedge heads 96 wedged into opposite alined socket members 97. The inner ring members 92 are thus rigidly secured and locked together in spaced, parallel relation with the ends of the locking bars 95 also being then positioned extending radially outwardly a distance across the inner sides of the outer ring members 91 thereby locking the outer ring members against movement inwardly toward each other relative to the inner ring members 92.

The outer ring member 91 of each ring assembly 90 of a bulkhead unit U is provided with tab members 94 on the inner side thereof spaced apart substantially equidistant therearound and extending radially inwardly a distance over and across the inner ring member 92 of the ring assembly, as will be clear by reference to FIG. 9 of the drawings. The tabs 94 thus lock and maintain the outer ring members 91 of a bulkhead unit U against movements outwardly away from each other relative to the inner ring members 92. The inner and outer ring members 92 and 91 of the ring assemblies 90 of a bulkhead unit U are in this manner removably assembled and locked in bulkhead unit forming relation.

A plurality of the bulkhead units U are mounted and supported in the lower form LF in positions disposed transversely thereacross and extending upwardly therefrom at spaced intervals therealong in the manner as shown in FIG. 21 of the drawings. The bulkhead units U provide the dividers or separators between piles P which are progressively cast in end-to-end relation along the casting bed B with the spacing between the bulkheads determining the lengths of the piles to be cast therebetween. The maximum external diameter of the outer ring member 91 of each ring assembly 90 corresponds to the external diameter of the piling to be cast while the internal diameter of each inner ring member 92 corresponds to the external diameter of the inner slip form IF and of the bore to be cast in the piling so that the inner slip form may extend and be displaced through the inner ring members of the bulkhead units U as it is moved along through the casting run. Thus, with the maximum external diameter of the outer rings 91 of the bulkhead units U corresponding to the external diameter of the piling to be cast, that is to say, corresponding to the internal diameter represented by the semi-cylindrical surface 34 of wall 33 of the outer slip form body structure 30, the outer slip form UF moves over and across the upper halves of the bulkhead units U with minimum clearance therewith but without structural interference thereby.

In the assembly and mounting of the bulkhead units U, the reinforcing strands 20 are extended through the outer ring members 91 thereof and are received and positioned in the recesses 93 with the inner ring members removed. With the reinforcing strands 20 so positioned in and extending through the recesses 93 of the outer ring members 91, the inner ring members 92 are positioned in the outer ring members closing the recesses 93 and confining the reinforcing strands therein. The locking bars 95 are then suitably forced into position, as by hammering them into wedging engagement in the wedging sockets 97, to complete the assembly and operative positioning of the ring assemblies 90 of each bulkhead unit U with the reinforcing strands 20 thus held and secured at spaced locations along their length in proper positions against displacement for casting into the walls of the piling.

In order to prevent the displacement or tilting from position of the bulkhead units U by the pressures exerted thereon by the pouring and placement of the concrete mix, each bulkhead unit is held against displacement or tilting by cable clamps or similar securing means 98. In this particular example four (4) of such cable clamps 98 are provided for each bulkhead unit U in positions secured to and spaced apart around the inner side of the outer ring member 91 of that ring assembly 90 of a bulkhead unit U which is on the side thereof of the approaching outer slip form UF during a casting run. The cable clamps 98 of each bulkhead unit so mounted are then clamped to the reinforcing strands adjacent thereto, respectively, as will be clear by reference to FIG. 9 of the drawings. Thus the bulkhead units U are secured and held against displacement or tilting in the direction of the casting run by the pressures created by the concrete mix being poured by the outer slip form UF as it approaches and passes over and across a bulkhead unit. The rigidity of the bars 95 makes a rigid assembly with the ring assemblies 90 and distortion of a bulkhead unit is prevented. The only movement possible for an assembled and mounted unit is in the event of failure of a clamp or clamps 98.

The bulkhead units U separate the piles P at the adjacent ends thereof along the casting bed B and provide the 12" spacing of this example therebetween with the reinforcing strands 20 bridging and extending through and across such spaces provided by each bulkhead unit, as shown in FIG. 21 of the drawings. Following a further teaching of the invention provision is made for removably covering such spaces between the ring assemblies 90 of the bulkhead units U to prevent pouring of concrete mix thereinto with the resulting collection and setting of such mix, as the outer slip form UF moves across such bulkhead units during a casting run along the casting bed B. In following this teaching in the example apparatus, a cover member C in the form of a semi-cylindrical plate 99 having the same radius of curvature as the radius of curvature of the internal semi-cylindrical surface 34 of the wall 33 of the outer slip form body structure 30, is provided of a width to fit over and extend across the spaced ring assemblies 90 of a bulkhead unit U. In order to mount the cover C on a bulkhead unit U with its outer surface substantially flush with and in the plane of the outer edge of the lower half of the outer ring members 91 of the ring assemblies 90 of a bulkhead unit U, the upper half 91a of each of these outer ring members is formed of less radial width than the lower half with the opposite side shoulders 91b joining and connecting the upper half 91a with the lower half of each outer ring member 91. Thus, the cover C may be fitted down over the upper halves 91a of the spaced ring members 91 of a bulkhead unit U in position over and closing the space therebetween. In FIG. 9 of the drawings such a cover C is shown in position relative to a ring assembly 90 of a bulkhead unit U with the cover C in position slightly raised from mounted position on the ring assembly.

In the example installation it has been found satisfactory to use only one cover C for the multiplicity of bulkheads U. This is accomplished by mounting the cover C on the bulkhead unit U which is first reached by the outer slip form UF on a casting run, that is, the bulkhead unit U separating the first pile P cast and the next pile to be cast, and then after the outer slip form UF has passed that bulkhead unit, removing the cover C and remounting it on the next bulkhead unit. This operation is then progressively continued from bulkhead unit to bulkhead unit along the casting run. However, a cover C can be provided for each bulkhead unit with these covers C removed only after the casting run is completed, if preferred.

Thus, with the bulkhead units U mounted in their proper spaced relation on and along the lower form LF on the casting bed B, the inner slip form IF may move freely through the axially alined inner ring members 92 of the bulkhead units during a casting run, while the outer slip form UF moves equally freely along the casting bed over and across each of the bulkhead units as it successively reaches each such unit.

*The casting method*

In carrying out the method of the invention for progressively casting reinforced and prestressed hollow concrete members progressively along a casting bed utilizing apparatus of the invention as expressed by the example installation hereof, bulkhead units U are first mounted in the required spaced locations on and in the lower form LF along the length thereof to provid spaces therebetween for casting therein the desired number of piles having the desired individual lengths in end-to-end relation along the casting bed. The reinforcing strands 20 are extended through and are positioned by the bulkhead units U in the manner as hereinabove described, with the strands being suitably tensioned by the tensioning units T and T' at the opposite ends of the casting bed. In this particular example installation the bulkhead units U are mounted spaced apart distances of from 70' to 85' for the casting of piles therebetween of corresponding lengths, respectively.

The outer slip form UF is positioned at the starting end of the casting bed B for the casting run along the bed and over the lower form LF. So mounted and positioned, the outer slip form UF is movably supported and confined against lateral displacement on and by the rails 15 and the flanges 37 with the outer slip form positioned over and spaced the proper distance from the upper half of the reinforcing cage formed of the strands 20 and the reinforcing wire spiral 26. The draft line 60 from the powered winding drum 62 of the winch unit L for the outer slip form UF, is connected and coupled to the draft bar 61 at the forward side of the outer slip form so that the latter may be drawn forwardly through the casting run at the desired rate of displacement by the variable speed motor driven winch unit L.

With the outer slip form UF located on the casting bed B in position for the start of a casting run, the inner slip form IF is mounted and supported in proper position axially alined with the molding cavity formed by the lower form LF and the inner wall 34 of the body structure 30 of the outer slip form UF. The inner slip form IF extends forwardly through the outer slip form UF with its leading end at or extending a distance beyond the leading end of the outer slip form. The inner slip form IF at the start of a casting run is supported at its forward end by the forwardly extending support beam 75 thereof movably resting and supported on the forwardly spaced roller units R mounted in the lower form LF and with the inner slip form extending axially through and spaced from the reinforcing cage therearound formed of the reinforcing strands 20 and the reinforcing spiral 26. The inner slip form IF is normally of such a length as to extend rearwardly a substantial distance rearwardly beyond the rear or trailing end of the outer slip form UF. Referring now to FIG. 1a of the drawings, the inner slip form IF of the example installation when in its position at the start of a casting run extends rearwardly beyond the adjacent end of the casting bed B, through the central bore 24 through the dolly 23 of the tensioning unit T and through that unit to a supporting way or cradle Y which in this example happens to be of wooden truss construction and which provides along its upper side a support bed 100 for the rear end length of the inner slip form IF or of an inner slip form trailing section IFT.

The draft line 65 from the variable speed motor driven winch L' is coupled and connected to the leading end of the inner slip form IF through the eye 83 provided in such leading end for this purpose. The draft line 65 is guided over blocks or pulleys 65a and 65b from the winding drum 62' of winch unit L' to a position for a straight-line pull or drag on the support beam 75 and the inner slip form IF rigidly connected thereto. The inner slip form IF is drawn or moved forwardly from its starting position through the casting run by winding the draft line 65 onto the winding drum 62' by powered operation of the latter by the variable speed motor 63' of the winch unit L'.

With the outer slip form UF at its starting position at the starting end of the casting bed B, such approximate starting position of the upper slip form being shown in FIGS. 1a and 1b, and with the inner slip form IF in its starting position as shown in FIG. 1a, the hopper H is filled and charged with concrete mix preparatory to starting the casting run. If only a single cover C for the bulkhead units U is utilized, then such cover C is placed on, over, and closing the space within the bulkhead unit U that will first be encountered by the inner and outer slip forms as these slip forms are moved from starting position along the casting run. If, however, covers C are provided for the series of bulkhead units U, then a cover C is placed on and closing each bulkhead unit and such covers may remain so positioned until the end of the casting run and the progressive casting of the piles P along the casting bed B, after which all of the covers C may then be removed for severing of the reinforcing cage extending between the cast piles.

The simultaneous but independent movements of the outer slip form UF and the inner slip form IF are then started and the next step of the method of casting of the invention is then performed and carried out. The winch unit L is placed into operation by operating its variable speed driving motor 63 to rotate the winding drum 62 thereof and wind thereon the draft line 60 at a rate of speed of lineal movement to move the outer slip form at the desired rate along the casting run. At the same time, the winch unit L' is placed into operation by operating its variable speed driving motor 63' to rotate the winding drum 62' to wind thereon the draft line 65 to move the inner slip form along the casting run at the desired rate of lineal movement therealong. If an inner slip form IF is used of a substantial length as, for example, a slip form IF with a trailing section or sections IFT coupled thereto, it may be found necessary or desirable to have the leading end length of the inner slip form and of its support beam 75 extend a substantial distance forwardly beyond the leading end of the outer slip form with the inner and outer slip forms in their starting position. In this event, at the start of the casting run the inner slip form is moved at a lower rate of speed along the casting bed B than the rate of speed of the movement of the outer slip form UF along the casting bed until the outer slip form has overtaken or is positioned with its leading end at or adjacent the leading end of the inner slip form. Thereafter, by suitably independently adjusting or varying the speed of operation of the winch unit L and of the winch unit L', the simultaneous but independent movements of the inner slip form and the outer slip form may be substantially at the same rates of speed forwardly along the casting run with the inner and outer slip forms thus maintaining their relative positions on the casting bed as they move therealong through the remainder of the casting run.

As concrete mix is poured and discharged downwardly from the hopper H along the opposite sides of the inner slip form IF through the opposite, spaced-apart and separate side discharge openings 55 of the hopper, the concrete mix first fills the molding cavity beneath and around the portion of the inner slip form that is located below the hopper H and this concrete mix builds up around and over the inner slip form and is shaped by the following action of the inner surface 34 of the cavity forming wall 33 of the body structure 30 of the outer slip form. The concrete mix thus poured and discharged from the hopper H forms the wall of the hollow member being cast and covers and imbeds therein the reinforcing cage formed of the reinforcing strands 20 and the reinforcing wire spiral 26. At the start of the casting run the inner slip form is supported at its forward end by the forwardly extending support beam 75 slidably resting and supported on the rollers 81 of the roller units R, and at its rear end length is supported on the cradle Y, as will be clear by reference to FIG. 1a. As the concrete mix fills the casting cavity within the lower form LF beneath the inner slip form, such body of concrete mix then begins to give support to the static weighted inner slip form IF and by the time the trailing length of the inner slip form has moved forwardly over the cradle Y and is clear of and unsupported by such cradle, the inner slip form IF will then be supported and maintained in proper position by the mass of concrete mix that has been poured and has built up beneath and around and over the inner slip form and by the forwardly extending support beam 75 on the roller units R.

If desired or found expedient at the start of a casting run, the trailing end length of the inner slip form IF may be supported by suitable blocks or other supports temporarily placed thereunder so as to maintain the inner slip form level or in its proper position for the casting run. If such temporary supporting blocks or members are used, they are then removed when the inner slip form has become completely surrounded and enveloped by the forming concrete which will then maintain the inner slip form with the support beam 75 at the leading end thereof on the roller units R, in the required level position aided by the longitudinal stiffness of the inner slip form and the weight provided therein by the bars W'.

The length of the inner slip form and the length of that form and any trailer section or sections IFT coupled thereto, is primarily determined by the rate of displacement of the inner slip form. In the installation of the selected example hereof the length of the inner slip form and the rate of displacement thereof is such that the inner slip form remains within the enveloping and forming concrete piling for approximately 30″ during which time period it gives support to the forming concrete which after such time period will have set sufficiently to be shape-sustaining without the need for further internal support. In other words, if the rate of speed of displacement or movement is speeded up and increased, the length of the inner form used would have to be increased in order to provide a sufficient time period during which the inner slip form lends internal support to the forming parts of the hollow member being cast while the concrete is setting to a condition to be shape sustaining. If, for example, warmer weather speeds up the setting time of the concrete being used, then it becomes possible to either shorten the length of the inner slip form or increase the rate of displacement thereof. As inner slip forms of substantial length present no particular difficulties or hardships for the operation, it is believed preferable to use such longer forms rather than to attempt basically to reduce inner form lengths to meet particular conditions. In the selected installation embodying the invention and carrying out the method thereof, the inner slip form assembly is displaced at the rate of 3 to 3½′ per minute. However, if, for example, a casting run is started in the morning, and the weather becomes warmer during the middle of the day or toward the completion of the casting run, then the rate of displacement of the inner slip form assembly may be increased to, say, approximately 4′ per minute. And in this connection, in the example installation, an inner slip form comprised of the primary inner slip form IF and two trailing sections IFT are employed, having a total slip form assembly or core member length of 104′.

The simultaneous but independent movements of the inner slip form IF and the outer slip form UF are in normal operation continued along the casting bed throughout the casting run without interruption until the outer slip form UF has passed over and completed the pouring of the concrete mix for the last pile of the series of end-to-end piles which have been cast during the casting run. When the outer slip form UF reaches the end of the casting run, its movement is stopped and the movement of the inner slip form IF may be continued until it has been withdrawn from and is clear of the cast pile. It will be noted that the dolly 22′ has a central bore therethrough similar to the bore 24 of the dolly 22 and that dolly 22′ is mounted in position with its bore alined axially with the inner slip form IF. The bore through the dolly 22′ has a diameter to freely receive the inner slip form IF therethrough. Thus, when the inner slip form is withdrawn from the cast piling at the completion of a casting run, it may pass freely through the bore of the dolly 22 without obstruction from the dolly.

During the casting run each successive innermost roller unit of the spaced roller units R on which the support beam 75 of the inner slip form IF rests, is manually removed from its mounted position in the lower form LF when the cut-out 77 of the support beam reaches such innermost roller unit. This removed roller unit R is then remounted in the lower form LF in a position spaced a distance ahead of the leading end of the support beam 75. Similarly, if only a single cover member C is supplied and used for closing the bulkhead units U, such cover member C is removed from each successive bulkhead as the outer slip form UF clears that bulkhead unit and is then mounted on and covers the next succeeding bulkhead unit along the lower form LF. If each bulkhead unit is provided with its own cover member C, there is, of course, no necessity for removing any of such cover members until the casting run has been completed.

During and upon completion of the casting run a cover or covers C for the bulkhead units U have closed off the spaces between the adjacent ends of the cast piles P between the ring assemblies 90 of each bulkhead unit C, so that no concrete mix has entered into these spaces. Thus, when the cover or covers C are removed from the bulkhead units, the reinforcing strands 20 and reinforcing wire spiral 26, if used, bridging the ring assembly 90 of each bulkhead unit are fully exposed and readily accessible. The reinforcing strands 20 and wire reinforcing spiral 26 are then severed or cut at the portions thereof which bridge each bulkhead unit U between the cast piles. This relieves the tension on the reinforcing strands 20 at opposite ends of each individual pile and thus results in compressive forces being applied to the pile by the relieved reinforcing strands with the pile then pre-stressed thereby. With the individual piles P thus disconnected and separated from each and prestressed, each pile may be removed from its position in the lower form LF between bulkhead units U, by opening the door or doors 18 which are provided through the lower form LF at the inner ends of the passages 16 through the body structure 10 of the casting bed B along each individual pile P, and then inserting a suitable tool or implement into the lower form LF for engaging the pile and rolling or levering it from the position in which it was cast in the lower form to position removed from the lower form and the casting bed B.

After a casting run has been completed, the outer slip form assembly UF and the inner slip form IF are then suitably moved or transported back to the opposite end of the casting bed for repositioning for the start of the next casting run. With an installation of the size and dimensions of the present example, suitable crane equipment, such as a gantry crane, is used for lifting and transporting the slip form assemblies back to position for assembly for starting a casting run.

With the example installation for casting piles of the dimensions and characteristics as above defined, higher casting speeds may be used where concrete curing and mixing techniques permit; hence, there is no desire or intention to in any way limit the invention to the specific casting speeds hereinabove set forth.

While in this example installation hollow, cylindrical section piling is cast, it will be understood that apparatus and methods of the invention may be utilized to cast concrete members of any desired external and/or internal cross-sectional shapes, such, for example, as square, octagonal, hexagonal and other cross-sectional shapes. Similarly, the invention is not limited to concrete piles or other members of the dimensions of the piles P that are cast with the example installation. Any number of concrete members may be cast and casting runs of various lengths may be carried out. The concrete members cast by the method and/or with apparatus of the invention may be solid or hollow, reinforced or without reinforcing, pre-stressed or unstressed, as may be desired. For example, the cast members such as the piles of the example may be reinforced by utilizing mild reinforcing steel without prestressing. If desired, a single concrete member, such as a pile, may be cast or a plurality of concrete members may be cast as with the illustrated and described example installation.

And while the example installation is utilized for casting concrete piles, apparatus and methods of the invention may be employed to cast various other concrete members, such as railroad ties, telephone poles, and various other forms of structural items or members.

It will also be evident that various other changes, modifications, constructions, combinations, substitutions and additions may be resorted to in the apparatus and in the method of my invention, without departing from the broad spirit and scope of the invention, and hence I do not intend or desire to limit my invention in all respects to the exact and specific examples of the apparatus and methods of the invention as herein disclosed, except as may be required by intended specific limitations thereto appearing in any of the claims hereto appended.

What I claim is:

1. In apparatus for casting hollow concrete members, in combination, a casting bed; a lower open top form mounted in fixed position on and along said casting bed;

an outer slip form movably mounted on said casting bed over said lower form for movement in one direction thereover and therealong during a casting run; an inner slip form movably mounted and maintained in position extending through said outer slip form between and spaced from said lower form and said outer slip form; the length of said inner slip form being in direct relation to the rate of speed of displacement of the outer slip form and the inner slip form along the casting bed during a casting run, to the plasticity of the concrete and the rate of set of the concrete; means for simultaneously moving said outer slip form and said inner slip form on said casting bed over and along said lower form through a casting run; and hopper means mounted on said outer slip form at the leading end thereof for continuously pouring concrete mix into said lower form around said inner form and between said lower form and said outer form as said inner and outer slip forms are simultaneously moved along said casting bed during a casting run; a frame structure pivotally connected to the trailing end of said outer slip form; and a finishing trowel member mounted on the rear end of said frame structure for engaging the exterior upper surface of a forming concrete member as said outer slip form is moved therealong through a casting run; said frame structure being movable on its pivotal mounting to move said trowel member from active to inactive position.

2. In apparatus for casting hollow concrete members, in combination, a casting bed; a lower open top form mounted in fixed position on and along said casting bed; an outer slip form movably mounted on said casting bed over said lower form for movement over and along said lower form; an inner slip form movably mounted and maintained in position extending through said outer slip form between and spaced from said lower form and said outer slip form; the length of said inner slip form being in direct relation to the rate of speed of displacement of the outer slip form and the inner slip form along the casting bed during a casting run, to the plasticity of the concrete and the rate of set of the concrete; a first variable speed powered means connected with said outer slip form for moving the latter along said casting bed over said lower form at a selected rate of speed; and a second variable speed power means independent of said first variable speed powered means and connected with said inner slip form for moving the latter along said casting bed at a selected rate of speed simultaneously with but independently of the movement of said outer slip form by said first mentioned variable speed powered means.

3. In apparatus for casting hollow concrete members in accordance with claim 2, wherein said casting bed is open at each end thereof.

4. In apparatus for casting hollow concrete members in accordance with claim 2, wherein means for continuously feeding concrete mix is carried on said outer slip form, and the concrete mix is fed directly from said means about said inner slip form.

References Cited by the Examiner

UNITED STATES PATENTS

| | | | |
|---|---|---|---|
| 695,749 | 3/1902 | Martin | 25—32 |
| 1,039,552 | 9/1912 | Leonard | 25—154 |
| 1,075,877 | 10/1913 | Turner | 25—32 |
| 1,455,686 | 5/1923 | Wallace | 25—128 |
| 2,036,367 | 4/1936 | Shinn et al. | 25—103 |
| 2,324,760 | 7/1943 | Brulatte | 25—32 |
| 2,730,783 | 1/1956 | Kennison | 25—30 |
| 2,845,658 | 8/1958 | Knibb | 25—128 |
| 2,932,874 | 4/1960 | Ludwig et al. | 25—30 |
| 2,938,255 | 5/1960 | Oakden | 25—32 |
| 2,948,042 | 8/1960 | Sylvester | 25—118 |
| 2,948,942 | 8/1960 | Gordan | 25—32 |
| 2,969,576 | 1/1961 | Fuller | 25—32 |
| 3,047,928 | 8/1962 | Carr | 25—32 |
| 3,049,786 | 8/1962 | Jones | 25—32 |
| 3,056,183 | 10/1962 | Pigeot | 25—154 |
| 3,092,886 | 6/1963 | Dykeman et al. | 249—50 |
| 3,159,897 | 12/1964 | Ellis | 25—32 |

FOREIGN PATENTS

| | | |
|---|---|---|
| 228,818 | 6/1960 | Australia. |
| 561,135 | 5/1944 | Great Britain. |
| 147,487 | 10/1954 | Sweden. |

J. SPENCER OVERHOLSER, *Primary Examiner.*

ALEXANDER H. BRODMERKEL, ROBERT F. WHITE, *Examiners.*

J. A. FINLAY, G. A. KAP, *Assistant Examiners.*